United States Patent
Lee et al.

(10) Patent No.: US 12,279,241 B2
(45) Date of Patent: Apr. 15, 2025

(54) METHOD AND APPARATUS FOR PROCESSING TRANSPORT BLOCK

(71) Applicant: LG Electronics Inc., Seoul (KR)

(72) Inventors: Jongku Lee, Seoul (KR); Dongsun Lee, Seoul (KR); Byounggill Kim, Seoul (KR); Hyunmin Kim, Seoul (KR); Taehowan Hong, Seoul (KR); Seju Park, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 17/918,451

(22) PCT Filed: Feb. 22, 2022

(86) PCT No.: PCT/KR2022/002590
§ 371 (c)(1),
(2) Date: Oct. 12, 2022

(87) PCT Pub. No.: WO2023/163239
PCT Pub. Date: Aug. 31, 2023

(65) Prior Publication Data
US 2024/0406936 A1    Dec. 5, 2024

(51) Int. Cl.
*H04W 72/0446* (2023.01)
*H04L 5/00* (2006.01)
*H04W 72/232* (2023.01)

(52) U.S. Cl.
CPC ....... *H04W 72/0446* (2013.01); *H04L 5/0044* (2013.01); *H04W 72/232* (2023.01)

(58) Field of Classification Search
CPC ........... H04W 72/0446; H04W 72/232; H04W 72/543; H04L 5/0044; H04L 1/0026;
(Continued)

(56) References Cited

U.S. PATENT DOCUMENTS

2022/0095351 A1* 3/2022 Baldemair ............ H04L 1/1812
2022/0263603 A1* 8/2022 Papasakellariou .... H04L 1/1671
(Continued)

FOREIGN PATENT DOCUMENTS

| WO | WO 2005/013525 | 2/2005 |
| WO | WO2020141994 | 7/2020 |
| WO | WO 2021/088981 | 5/2021 |

OTHER PUBLICATIONS

Ericsson, "PDSCH/PUSCH enhancements," Tdoc R1-2109438, Presented at 3GPP TSG-RAN WG1 Meeting #106-bis-e, e-Meeting, Oct. 11-19, 2021, 61 pages.
(Continued)

*Primary Examiner* — Walli Z Butt
(74) *Attorney, Agent, or Firm* — Fish & Richardson P.C.

(57) ABSTRACT

Provided are a method for processing a transport block of an apparatus in a wireless communication system and an apparatus using the method. The apparatus receives downlink control information (DCI) and performs one of reception and transmission of a plurality of transport blocks within one transmit time interval (TTI) scheduled by the DCI. An MCS independent of each other is applied to each of the plurality of transport blocks, and a CRC for each transport block is added. The DCI includes information indicating MCS applied to each of the plurality of transport blocks and information indicating the amount of resources allocated to each of the plurality of transport blocks. The plurality of transport blocks are received or transmitted from a transport block having the highest required QoS.

20 Claims, 22 Drawing Sheets

(58) Field of Classification Search
CPC ..... H04L 1/203; H04L 1/0001; H04L 5/0064; H04L 5/00; H04L 1/0003
See application file for complete search history.

(56) References Cited

U.S. PATENT DOCUMENTS

2023/0354331 A1* 11/2023 MolavianJazi ... H04W 72/1273
2024/0015760 A1* 1/2024 Awadin ............... H04W 72/232

OTHER PUBLICATIONS

Huawei & HiSilicon, "PDSCH/PUSCH enhancements for 52-71GHz spectrum," R1-2108771, Presented at 3GPP TSG RAN WG1 Meeting #106bis-e, e-Meeting, Oct. 11-Oct. 19, 2021, 31 pages.

Intel Corporation, "Discussion on PDSCH/PUSCH enhancements for extending NR up to 71 GHz," R1-2109602, Presented at 3GPP TSG RAN WG1 Meeting #106-bis-e, e-Meeting, Oct. 11-19, 2021, 35 pages.

International Search Report in International Appln. No. PCT/KR2022/002590, dated Nov. 11, 2022, 9 pages (with English translation).

Nokia & Nokia Shanghai Bell, "PDSCH/PUSCH enhancements," R1-2109446, Presented at 3GPP TSG RAN WG1 #106bis, e-Meeting, Oct. 11-19, 2021, 19 pages.

Futurewei, "Enhancements to support PDSCH/PUSCH for beyond 52.6GHz," R1-2104212, 3GPP TSG RAN WG1, Meeting #105-e, e-Meeting, May 19-27, 2021, 14 pages.

Huawei, HiSilicon, "UE Feedback enhancements for HARQ-ACK," R1-2108726, 3GPP TSG RAN WG1, Meeting #106bis-e, e-Meeting, Aug. 11-19, 2021, 21 pages.

Nokia, Nokia Shanghai Bell, "PDSCH/PUSCH enhancements," R1-2201665, 3GPP TSG RAN WG1, Meeting #108-e, e-Meeting, Feb. 21-Mar. 3, 2022, 10 pages.

Office Action in Japanese Appln. No. 2022-558455, mailed on Mar. 26, 2024, 10 pages (with English translation).

ZTE, "Discussion on CSI feedback enhancements for eURLLC," R1-2106735, 3GPP TSG RAN WG1, Meeting #106-e, e-Meeting, Aug. 16-27, 2021, 7 pages.

* cited by examiner

METHOD AND APPARATUS FOR PROCESSING TRANSPORT BLOCK

CROSS-REFERENCE TO RELATED APPLICATIONS

This application is a National Stage application under 35 U.S.C. § 371 of International Application No. PCT/KR2022/002590, filed on Feb. 22, 2022. The disclosure of the prior application is incorporated by reference in its entirety.

BACKGROUND OF THE DISCLOSURE

Field of the Disclosure

The present specification relates to a method and apparatus for processing a transport block in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc.

As wireless communication technology and terminal technology develop, a single terminal (User Equipment: UE) provides various services requiring different Quality of Service (QoS) and/or the need to provide one service composed of functions requiring various QoS is increasing. As an example of providing various services requiring different QoS in one UE, a smartphone user may use a social networking service (SNS) or perform an Internet search while watching a video. As an example of providing one service composed of functions requiring various QoS, there may be AR/VR services that provide visual data and auditory data requiring different data transmission rates and delay times. Meanwhile, as various types of devices including autonomous vehicles as well as devices directly used by humans, such as smartphones, require wireless communication functions, the number of devices accessing wireless communication networks is rapidly increasing. Accordingly, the need for a radio access technology capable of supporting multiple QoS transmission to a plurality of UEs is increasing.

In the conventional radio access technology, all data included in one transport block are transmitted using the same transmission scheme (e.g., the same modulation and coding scheme (MCS)). In this transmission method, there may be no major problem when the size of the transport block is small, but when the size of the transport block is large, transmission efficiency and transmission quality may be deteriorated.

This problem can be solved by separating data requiring different QoS and transmitting the data through a plurality of transport blocks. However, when this method is applied, a problem arises in that control channels as many as the number of transport blocks should be used. Since the control channel is not a channel for transmitting actual data, but an additional channel for transmitting data, an increase in resources allocated to the control channel may result in a decrease in overall system capacity.

SUMMARY OF THE DISCLOSURE

In order to solve the above-described problem, a technique of scheduling a plurality of transport blocks (TBs) through one downlink control information (DCI) may be used. A plurality of TBs can be transmitted by using different MCSs through one shared channel. In this case, a method of notifying each of the MCSs for the plurality of TBs and a method of minimizing an increase in the size of the DCI are needed.

In addition, there is a need for a method for notifying the amount of resources allocated to each of the plurality of TBs through the DCI and a method for minimizing an increase in the size of the DCI.

In order to solve the above problems, a method for processing a transport block of a UE in a wireless communication system and an apparatus using the method are provided.

In one aspect, the UE receives downlink control information (DCI) and performs one of reception and transmission of a plurality of transport blocks within one transmit time interval (TTI) scheduled by the DCI. An MCS independent of each other is applied to each of the plurality of transport blocks, and a CRC for each transport block is added. The DCI includes information indicating the MCS applied to each of the plurality of transport blocks and information indicating the amount of resources allocated to each of the plurality of transport blocks.

In another aspect, a UE and a processing device for implementing the method, a computer readable medium (CRM) is provided.

In another aspect, a method performed by a base station is provided. The method transmits downlink control information (DCI) and performs one of transmission and reception of a plurality of transport blocks within one TTI scheduled by the DCI. To each of the plurality of transport blocks, i) an MCS independent of each other is applied, and ii) a CRC for each transport block is added. The DCI includes i) information indicating the MCS applied to each of the plurality of transport blocks, and ii) a time domain resource allocation (TDRA) field indicating a specific row of a resource allocation table. The specific row includes information indicating the number of symbols allocated to each of the plurality of transport blocks.

In another aspect, a base station implementing the method is provided.

The present disclosure can have various advantageous effects.

By differently allocating radio resources and modulation coding techniques according to physical transmission quality required for each of a plurality of transport blocks scheduled through one DCI, it is possible to efficiently use radio resources and increase system capacity.

In addition, the overhead for signaling the DCI can be minimized, thereby facilitating multiple QoS service support.

Advantageous effects which can be obtained through specific embodiments of the present specification are not limited to the advantageous effects listed above. For example, there may be a variety of technical effects that a person having ordinary skill in the related art can understand and/or derive from the present specification. Accordingly, the specific effects of the present specification are not limited to those explicitly described herein, but may include various effects that may be understood or derived from the technical features of the present specification.

DESCRIPTION OF EXEMPLARY EMBODIMENTS

Figure 1:
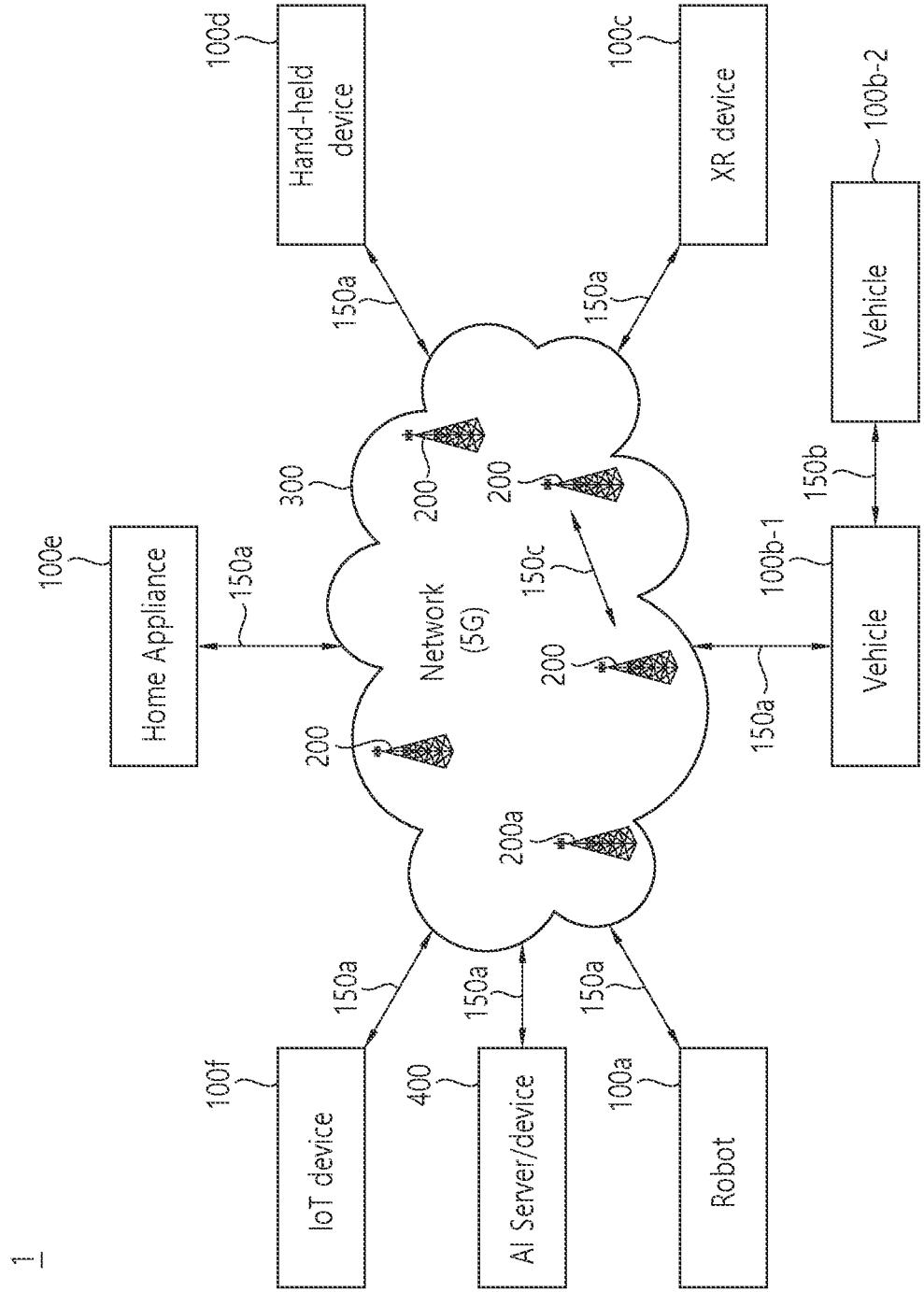
FIG. 1 illustrates an example of a communication system to which implementations of the present specification is applied.

Techniques, apparatuses, and systems to be described below may be applied to various wireless multiple access systems. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a system, and a Single Frequency Division Multiple Access (SC-FDMA) system. Carrier Frequency Division Multiple Access) systems, and MC-FDMA (Multi-Carrier Frequency Division Multiple Access) systems. CDMA may be implemented through a radio technology such as Universal Terrestrial Radio Access (UTRA) or CDMA2000. TDMA may be implemented through a radio technology such as Global System for Mobile communications (GSM), General Packet Radio Service (GPRS), or Enhanced Data rates for GSM Evolution (EDGE). OFDMA may be implemented through a wireless technology such as Institute of Electrical and Electronics Engineers (IEEE) 802.11 (Wi-Fi). IEEE 802.16 (WiMAX). IEEE 802.20, or Evolved UTRA (E-UTRA). UTRA is part of the Universal Mobile Telecommunications System (UMTS). 3rd Generation Partnership Project (3GPP) Long-Term Evolution (LTE) is a part of Evolved UMTS (E-UMTS) using E-UTRA 3GPP LTE uses OFDMA in downlink (DL) and SC-FDMA in uplink (UL). Evolution of 3GPP LTE includes LTE-A (Advanced). LTE-A Pro, and/or 5G New Radio (NR).

For convenience of description, implementations of the present specification are mainly described in the context of a 3GPP-based wireless communication system. However, the technical characteristics of the present specification are not limited thereto. For example, the following detailed description is provided based on a mobile communication system corresponding to the 3GPP-based wireless communication system, but aspects of the present specification that are not limited to the 3GPP-based wireless communication system may be applied to other mobile communication systems.

For terms and techniques not specifically described among terms and techniques used in this specification, reference may be made to a wireless communication standard document issued before this specification.

In this specification, "A or B" may mean "only A", "only B", or "both A and B". In other words, "A or B" herein may be interpreted as "A and/or B". For example, "A. B or C" herein means "only A", "only B". "only C", or "any and any combination of A, B and C".

As used herein, a slash (/) or a comma (comma) may mean "and/or". For example, "A/B" may mean "A and/or B". Accordingly, "A/B" may mean "only A", "only B", or "both A and B". For example, "A, B, C" may mean "A, B. or C".

As used herein, "at least one of A and B" may mean "only A", "only B", or "both A and B". In addition, in this specification, the expression "at least one of A or B" or "at least one of A and/or B" means "at least one of A and B".

Also, as used herein, "at least one of A, B and C" means "only A", "only B", "only C", or "any combination of A, B and C". In addition, "at least one of A, B or C" or "at least one of A, B and/or C" means can mean "at least one of A, B and C".

In addition, parentheses used herein may mean "for example". Specifically, when displayed as "control information (PDCCH)", "PDCCH" may be proposed as an example of "control information". In other words, "control information" in the present specification is not limited to "PDCCH", and "PDCCH" may be proposed as an example of "control information". In addition, even when displayed as "control information (i.e., PDCCH)", "PDCCH" may be proposed as an example of "control information".

Technical features that are individually described in one drawing in this specification may be implemented individually or may be implemented at the same time.

Although not limited thereto, the various descriptions, functions, procedures, proposals, methods, and/or operation flowcharts disclosed herein may be applied to various fields requiring wireless communication and/or connection (e.g., 5G) between devices.

Hereinafter, the present specification will be described in more detail with reference to the drawings. In the following drawings and/or descriptions, the same reference numbers may refer to the same or corresponding hardware blocks, software blocks, and/or functional blocks unless otherwise indicated.

FIG. 1 shows an example of a communication system to which an implementation of the present specification is applied.

The 5G usage scenario shown in FIG. 1 is only an example, and the technical features of the present specification may be applied to other 5G usage scenarios not shown in FIG. 1.

The three main requirements categories for 5G are (1) enhanced Mobile BroadBand (eMBB) category, (2) massive Machine Type Communication (mMTC) category, and (3) ultra-reliable, low-latency communication. (URLLC: Ultra-Reliable and Low Latency Communications) category.

Referring to FIG. 1, the communication system I includes wireless devices 100a~100f, base station 200, and a network 300. Although FIG. 1 illustrates a 5G network as an example of the network of the communication system 1, the implementations of the present disclosure are not limited to the SG system, and can be applied to the future communication system beyond the 5G system.

The BS 200 and the network 300 may be implemented as wireless devices and a specific wireless device may operate as a BS/network node with respect to other wireless devices.

The wireless devices 100a~100f, represent devices performing communication using radio access technology (RAT) (e.g., 5G New RAT (NR)) or Long-Term Evolution (LTE)) and may be referred to as communication/radio/5G devices. The wireless devices 100a~100f may include, without being limited to, a robot 100a, vehicles 100b-1 and 100b-2, an extended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. The vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present specification, the wireless devices 100a~100f may be called user equipments (UEs). A user equipment (UE) may include, for example, a cellular phone, a smartphone, a laptop computer, a digital broadcast, a personal digital assistant (PDA), a portable multimedia player (PMP), a navigation system, a slate personal computer (PC), a tablet PC, an ultrabook, a vehicle, a vehicle having an autonomous traveling function, a connected car, an unmanned aerial vehicle (UAV), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or a financial device), a security device, a weather/environment device, a device related to a 5G service, or a device related to a fourth industrial revolution field.

For example, the unmanned aerial vehicle (UAV) may be an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a CCTV, a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a and 150b may be established between the wireless devices 100a to 100f/BS 200-BS 200. Herein, the wireless communication/connections may be established through various RAT's (e.g., 5G NR) such as uplink/downlink communication 150a and sidelink communication 150b (or D2D communication). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

AI refers to a field that studies artificial intelligence or a methodology that can create it, and machine learning refers to a field that defines various problems dealt with in the field of artificial intelligence and studies methodologies to solve them. Machine learning is also defined as an algorithm that improves the performance of a certain task through constant experience.

A robot can mean a machine that automatically handles or operates a task given by its own capabilities. In particular, a robot having a function of recognizing an environment and performing an operation by self-judgment may be referred to as an intelligent robot. Robots can be classified into industrial, medical, home, military, etc. according to the purpose or field of use. The robot may be provided with a driving unit including an actuator or a motor to perform various physical operations such as moving the robot joints. In addition, the movable robot includes a wheel, a brake, a propeller, and the like in the driving unit, and can travel on the ground or fly in the air through the driving unit.

Autonomous driving refers to a technology that drives by itself, and an autonomous driving vehicle refers to a vehicle that runs without or with minimal manipulation of a user. For example, autonomous driving may include all technologies that maintains a driving lane, technology that automatically adjusts speed such as adaptive cruise control, technology that automatically drives along a predetermined route, and technology that automatically sets a route when a destination is set etc. The vehicle includes a vehicle having only an internal combustion engine, a hybrid vehicle having both an internal combustion engine and an electric motor, and an electric vehicle having only an electric motor, and may include not only automobiles, but also trains, motorcycles, and the like. Autonomous vehicles can be viewed as robots with autonomous driving capabilities.

Augmented reality refers to VR, AR, and MR. VR technology provides objects and backgrounds in the real world only as CG images. AR technology provides virtual CG images on top of real objects. MR technology is a CG technology that mixes and combines virtual objects with the real world. MR technology is similar to AR technology in that it shows both real and virtual objects. However, there is a difference in that in AR technology, a virtual object is used in a form that complements a real object, whereas in MR technology, a virtual object and a real object are used with equal characteristics.

NR supports multiple numerology or, subcarrier spacing (SCS) to support various 5G services. For example, when the SCS is 15 kHz, wide area in traditional cellular bands may be supported. When the SCS is 30 KHz/60 KHz, dense-urban, lower latency and wider carrier bandwidth may be supported. When the SCS is 60 KHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For case of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHZ (or 5850, 5900, 5925 MHZ, etc.) or more. For example, a frequency band of 6 GHZ (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the wireless communication technology implemented in the wireless device of the present specification may include narrowband IoT (NB-IoT) for low-power communication as well as LTE, NR, and 6G. For example, the NB-IoT technology may be an example of a LPWAN (Low Power Wide Area Network) technology, and may be implemented in standards such as LTE Cat NB1 and/or LTE Cat NB2, and is not limited to the above-mentioned name.

Additionally or alternatively, the wireless communication technology implemented in the wireless device of the present specification may perform communication based on LTE-M technology. For example, the LTE-M technology may be an example of an LPWAN technology, and may be called by various names such as enhanced MTC (eMTC). For example, LTE-M technology may be implemented in at least one of various standards such as 1) LTE CAT 0, 2) LTE Cat M1, 3) LTE Cat M2, 4) LTE non-BL (Non-Bandwidth Limited), 5) LTE-MTC, 6) LTE MTC, and/or 7) LTE M, and is not limited to the above-described name. Additionally or alternatively, the wireless communication technology implemented in the wireless device of the present specification may include at least one of ZigBee, Bluetooth, and/or LPWAN in consideration of low-power communication, and it is not limited to the above-mentioned names. For example, the ZigBee technology may create PANs (Personal Area Networks) related to small/low-power digital communication based on various standards such as IEEE 802.15.4, and may be called by various names.

Figure 2:
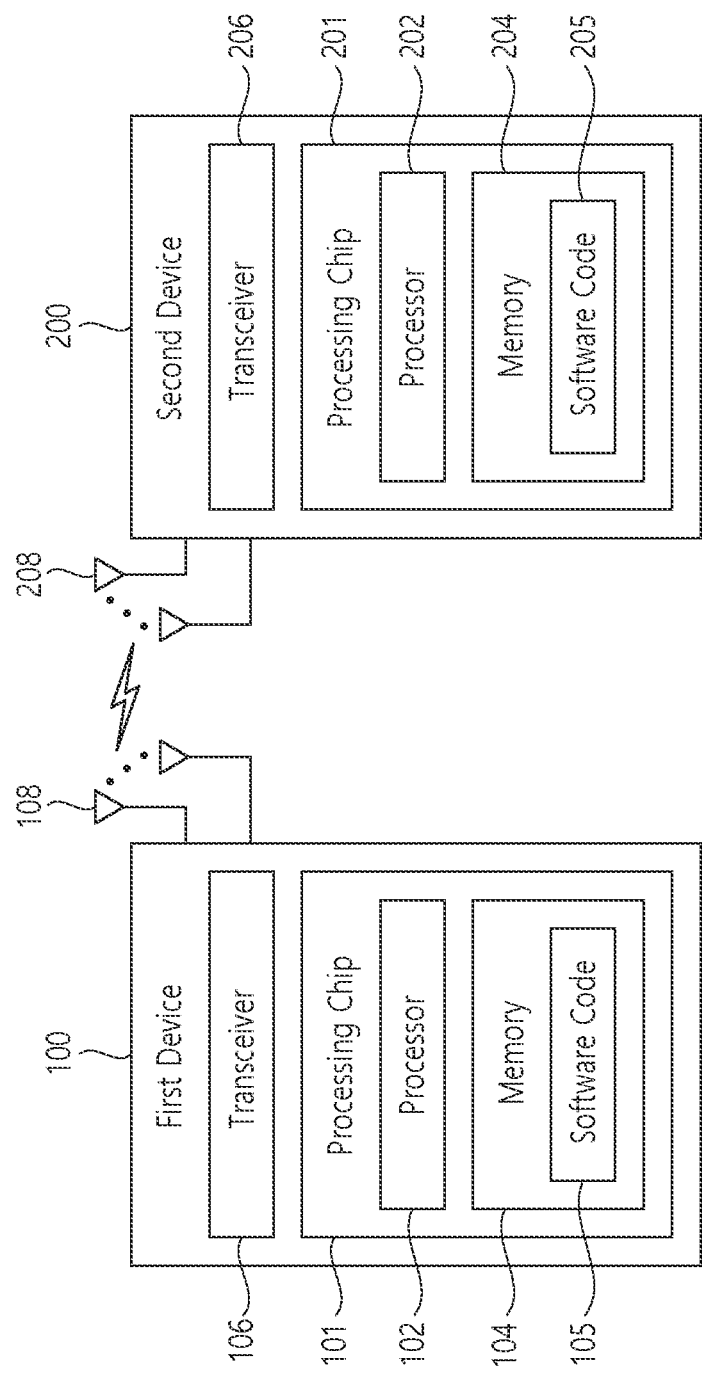
FIG. 2 shows an example of a wireless device to which the implementation of the present specification is applied.

FIG. 2 shows an example of a wireless device to which the implementation of the present specification is applied.

Referring to FIG. 2, the first wireless device 100 and the second wireless device 200 may transmit/receive radio signals to/from an external device through various RATs (e.g., LTE and NR).

In FIG. 2, {first wireless device 100 and second wireless device 200} may correspond to at least one of {wireless devices 100a to 100f and base station 200}, {wireless device 100a to 100f and wireless devices 100a to 100f} and/or {base station 200 and base station 200} in FIG. 1.

The first wireless device 100 may include at least one transceiver, such as a transceiver 106, at least one processing chip, such as a processing chip 101, and/or one or more antennas 108.

Processing chip 101 may include at least one processor, such as processor 102, and at least one memory, such as memory 104. In FIG. 2, an example in which the memory 104 is included in the processing chip 101 is shown. Additionally and/or alternatively, the memory 104 may be located external to the processing chip 101.

The processor 102 may control the memory 104 and/or the transceiver 106 and may be configured to implement the descriptions, functions, procedures, suggestions, methods, and/or operational flow diagrams disclosed herein. For example, the processor 102 may process information in the memory 104 to generate first information/signal, and transmit a wireless signal including the first information/signal through the transceiver 106. The processor 102 may receive a wireless signal including the second information/signal through the transceiver 106, and store information obtained by processing the second information/signal in the memory 104.

Memory 104 may be operatively coupled to processor 102. Memory 104 may store various types of information and/or instructions. The memory 104 may store software code 105 that, when executed by the processor 102, implements instructions that perform the descriptions, functions, procedures, suggestions, methods, and/or operational flow diagrams disclosed herein. For example, the software code 105 may implement instructions that, when executed by the processor 102, perform the descriptions, functions, procedures, suggestions, methods, and/or operational flow diagrams disclosed herein. For example, software code 105 may control processor 102 to perform one or more protocols. For example, software code 105 may control processor 102 to perform one or more air interface protocol layers.

Here, the processor 102 and the memory 104 may be part of a communication modem/circuit/chip designed to implement a RAT (e.g., LTE or NR). The transceiver 106 may be coupled to the processor 102 to transmit and/or receive wireless signals via one or more antennas 108. Each transceiver 106 may include a transmitter and/or a receiver. The transceiver 106 may be used interchangeably with a radio frequency (RF) unit. In this specification, the first wireless device 100 may represent a communication modem/circuit/chip.

The second wireless device 200 may include at least one transceiver, such as a transceiver 206, at least one processing chip, such as a processing chip 201, and/or one or more antennas 208.

Processing chip 201 may include at least one processor, such as processor 202, and at least one memory, such as memory 204. In FIG. 2 shows an example in which the memory 204 is included in the processing chip 201. Additionally and/or alternatively, the memory 204 may be located external to the processing chip 201.

The processor 202 may control the memory 204 and/or the transceiver 206 and may be configured to implement the descriptions, functions, procedures, suggestions, methods, and/or operational flow diagrams disclosed herein. For example, the processor 202 may process the information in the memory 204 to generate third information/signal, and transmit a wireless signal including the third information/signal through the transceiver 206. The processor 202 may receive a radio signal including the fourth information/signal through the transceiver 206, and store information obtained by processing the fourth information/signal in the memory 204.

Memory 204 may be operatively coupled to processor 202. Memory 204 may store various types of information and/or instructions. The memory 204 may store software code 205 that, when executed by the processor 202, implements instructions that perform the descriptions, functions, procedures, suggestions, methods, and/or operational flow diagrams disclosed herein. For example, the software code 205 may implement instructions that, when executed by the processor 202, perform the descriptions, functions, procedures, suggestions, methods, and/or operational flow diagrams disclosed herein. For example, software code 205 may control processor 202 to perform one or more protocols. For example, software code 205 may control processor 202 to perform one or more air interface protocol lavers.

Here, the processor 202 and the memory 204 may be part of a communication modem/circuit/chip designed to implement a RAT (e.g., LTE or NR). The transceiver 206 may be coupled to the processor 202 to transmit and/or receive wireless signals via one or more antennas 208. Each transceiver 206 may include a transmitter and/or a receiver. The transceiver 206 may be used interchangeably with the RF unit. In this specification, the second wireless device 200 may represent a communication modem/circuit/chip.

Hereinafter, hardware elements of the wireless devices 100 and 200 will be described in more detail. Although not limited thereto, one or more protocol layers may be implemented by one or more processors 102, 202. For example, the one or more processors 102. 202 may implement one or more layers (e.g., functional layers such as a physical (PHY) layer, a Media Access Control (MAC) layer, a Radio Link Control (RLC) layer, a Packet Data Convergence Protocol (PDCP) layer, a Radio Resource Control (RRC) layer or a Service Data Adaptation Protocol (SDAP) layer). The one or more processors 102. 202 generate one or more Protocol Data Units (PDUs) and/or one or more Service Data Units (SDUs) according to the descriptions, functions, procedures, proposals, methods, and/or operational flow diagrams disclosed herein. One or more processors 102, 202 may generate messages, control information, data, or information in accordance with the descriptions, functions, procedures, proposals, methods, and/or operational flow diagrams disclosed herein. The one or more processors 102, 202 may configure a signal including a PDU, SDU, message, control information, data or information (e.g., a baseband signal) and provide it to one or more transceivers (106, 206). One or more processors 102, 202 may receive signals (e.g., baseband signals) from one or more transceivers 106, 206, PDU, SDU, message, control information, data or information may be obtained according to the description, function, procedure, proposal, method, and/or operation flowchart disclosed herein.

One or more processors 102, 202 may be referred to as controllers, microcontrollers, microprocessors, and/or microcomputers. One or more processors 102. 202 may be implemented by hardware, firmware, software, and/or a combination thereof. For example, one or more Application Specific Integrated Circuits (ASICs), one or more Digital Signal Processors (DSPs), one or more Digital Signal Processing Devices (DSPDs), one or more Programmable Logic Devices (PLDs), and/or one or more Field Programmable Gates (FPGAs) Arrays) may be included in one or more processors 102, 202. The descriptions, functions, procedures, suggestions, methods, and/or flow diagrams disclosed herein may be implemented using firmware and/or software, and the firmware and/or software may be implemented to include modules, procedures, functions. Firmware or software configured to perform the descriptions, functions, procedures, suggestions, methods, and/or operational flow charts disclosed herein may be included in one or more processors 102, 202, or stored in one or more memories 104, 204, and it may be driven by the above processors 102 and 202. The descriptions, functions, procedures, proposals, methods, and/or flow diagrams disclosed herein may be implemented using firmware or software in the form of code, instructions, and/or sets of instructions.

One or more memories 104. 204 may be coupled with one or more processors 102, 202 and may store various forms of data, signals, messages, information, programs, code, instructions, and/or instructions. The one or more memories 104. 204 may include read-only memory (ROM), random access memory (RAM), erasable programmable ROM (EPROM), flash memory, hard drives, registers, cache memory, computer readable storage media and/or it may consist of a combination of these. One or more memories 104, 204 may be located inside and/or external to one or more processors 102, 202. In addition, one or more memories 104, 204 may be coupled to one or more processors 102. 202 through various technologies, such as wired or wireless connections.

The one or more transceivers 106, 206 may transmit user data, control information, wireless signals/channels, etc. referred to in the descriptions, functions, procedures, suggestions, methods, and/or operational flow diagrams disclosed herein to one or more other devices. The one or more transceivers 106, 206 may receive user data, control information, radio signals/channels, etc. referred to in the descriptions, functions, procedures, suggestions, methods, and/or flow charts disclosed herein, from one or more other devices. For example, one or more transceivers 106. 206 may be coupled to one or more processors 102. 202 and may transmit and receive wireless signals. For example, one or more processors 102, 202 may control one or more transceivers 106. 206 to transmit user data, control information, wireless signals, etc. to one or more other devices. In addition, one or more processors 102, 202 may control one or more transceivers 106, 206 to receive user data, control information, radio signals, etc. from one or more other devices.

One or more transceivers 106. 206 may be coupled to one or more antennas 108, 208. One or more transceivers 106, 206 may be configured to transmit and receive to user data, control information, radio signals/channels referred to in the descriptions, functions, procedures, proposals, methods, and/or operational flow diagrams disclosed herein via one or more antennas 108, 208. Herein, the one or more antennas 108 and 208 may be a plurality of physical antennas or a plurality of logical antennas (e.g., antenna ports).

The one or more transceivers 106 and 206 may convert received user data, control information, radio signals/channels, etc. from RF band signals to baseband signals to process the received user data, control information, radio signals/channels, etc. using the one or more processors 102, 202. One or more transceivers 106 and 206 may convert user data, control information, radio signals/channels, etc. processed using one or more processors 102 and 202 from baseband signals to RF band signals. To this end, one or more transceivers 106, 206 may include (analog) oscillators and/or filters. For example, one or more transceivers 106, 206 up-convert OFDM baseband signals to OFDM signals via (analog) oscillators and/or filters under the control of one or more processors 102, 202, and may transmit an up-converted OFDM signal at a carrier frequency. One or more transceivers (106, 206) receive the OFDM signal at the carrier frequency and down-convert the OFDM signal to an OFDM baseband signal through an (analog) oscillator and/or filter under the control of one or more processors (102, 202).

In the implementation of the present specification, the UE may operate as a transmitting device in uplink (UL) and as a receiving device in downlink (DL). In the implementation of the present specification, the base station may operate as a receiving device in the UL and a transmitting device in the DL. Hereinafter, for technical convenience, it is mainly assumed that the first wireless device 100 operates as a UE and the second wireless device 200 operates as a base station. For example, the processor 102 connected to, mounted on, or released to the first wireless device 100 may be configured to control the transceiver 106 to perform a UE operation according to an implementation of the present specification or configured to perform a UE operation according to an implementation of the present specification. The processor 202 connected to, mounted on, or released to the second wireless device 200 may be configured to control the transceiver 206 to perform a BS operation according to an implementation of the present specification or configured to perform a BS operation according to an implementation of the present specification.

In this specification, the base station may be referred to as another term such as a Node B (Node B), an eNode B (eNB), a gNB, and the like.

Figure 3:
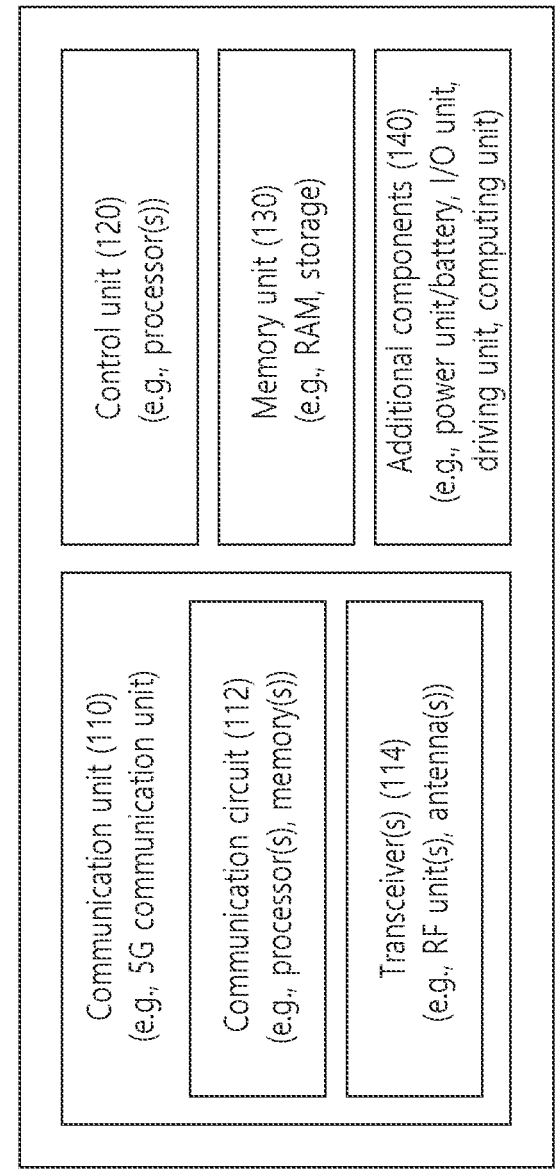
FIG. 3 shows another example of a wireless device to which the implementation of the present specification is applied.

FIG. 3 shows another example of a wireless device to which the implementation of the present specification is applied.

The wireless device may be implemented in various forms according to usage examples/services.

Referring to FIG. 3, the wireless devices 100 and 200 may correspond to the wireless devices 100 and 200 of FIG. 2, and may be configured by various components, devices/parts and/or modules. For example, each wireless device 100, 200 may include a communication device 110, a control device 120, a memory device 130, and an additional component 140. The communication device 110 may include communication circuitry 112 and a transceiver 114. For example, communication circuitry 112 may include one or more processors 102, 202 of FIG. 2 and/or one or more memories 104, 204 of FIG. 2. For example, transceiver 114 may include one or more transceivers 106, 206 of FIG. 2 and/or one or more antennas 108, 208 of FIG. 2. The control device 120 is electrically connected to the communication device 110, the memory device 130, and the additional component 140, and controls the overall operation of each wireless device 100, 200. For example, the control device 120 may control the electrical/mechanical operation of each of the wireless devices 100 and 200 based on the program/code/command/information stored in the memory device 130. The control device 120 transmits information stored in the memory device 130 to the outside (e.g., other communication devices) through the communication device 110 through a wireless/wired interface, or the control device 120 may store information received from the outside (e.g., other communication devices) through the communication device 110 through the wireless/wired interface in the memory device 130.

The additional component 140 may be variously configured according to the type of the wireless device 100 or 200. For example, the additional component 140 may include at least one of a power unit/battery, an input/output (I/O) device (e.g., an audio I/O port, a video I/O port), a drive unit, and a computing device. The wireless devices 100 and 200 may be implemented, not limited to, a robot (100a in FIG. 1), a vehicle (100b-1 and 100b-2 in FIG. 1), an XR device (100c in FIG. 1), and a portable device (100d in FIG. 1), home appliances (100e in FIG. 1), IoT devices (100f in FIG. 1), digital broadcast terminals, hologram devices, public safety devices, MTC devices, medical devices, fintech devices (or financial devices), security devices, a climate/environment device, an AI server/device (400 in FIG. 1), a base station (200 in FIG. 1), and a network node. The wireless devices 100 and 200 may be used in a moving or fixed location according to usage examples/services.

In FIG. 3, all of the various components, devices/parts and/or modules of the wireless devices 100 and 200 may be connected to each other via a wired interface, or at least some of them may be wirelessly connected via the communication device 110. For example, in each of the wireless devices 100 and 200, the control device 120 and the communication device 110 are connected by wire, and the control device 120 and the first device (e.g., 130 and 140) may be wirelessly connected through the communication device 110. Each component, device/portion and/or module within the wireless device 100, 200 may further include one or more elements. For example, the control device 120 may be configured by one or more processor sets. For example, the control device 120 may be configured by a set of a communication control processor, an application processor (AP), an electronic control unit (ECU), a graphic processing unit, and a memory control processor. As another example, the memory device 130 may be configured by RAM, dynamic RAM (DRAM), ROM, flash memory, volatile memory, non-volatile memory, and/or a combination thereof.

Figure 4:
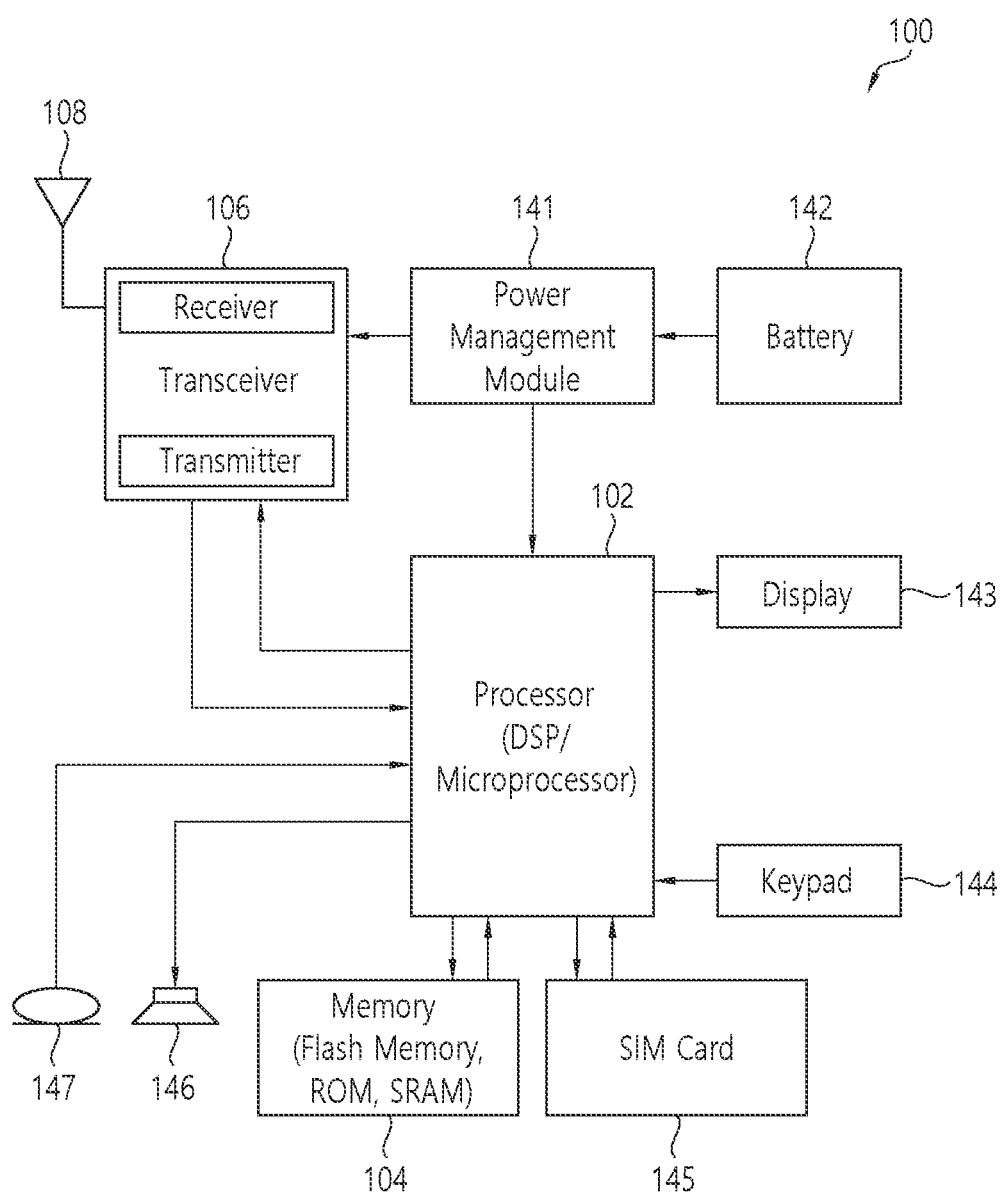
FIG. 4 shows an example of a UE to which the implementation of the present specification is applied.

FIG. 4 shows an example of a UE to which the implementation of the present specification is applied.

Referring to FIG. 4, the UE 100 may correspond to the first wireless device 100 of FIG. 2 and/or the wireless device 100 or 200 of FIG. 3.

The UE 100 may include a processor 102, a memory 104, a transceiver 106, one or more antennas 108, a power management module 141, a battery 142, a display 143, a keypad 144, a SIM (Subscriber Identification Module) card 145, a speaker 146, and a microphone 147.

The processor 102 may be configured to implement the descriptions, functions, procedures, suggestions, methods, and/or operational flow diagrams disclosed herein. The processor 102 may be configured to control one or more other components of the UE 100 to implement the descriptions, functions, procedures, suggestions, methods, and/or operational flow diagrams disclosed herein. A layer of air interface protocol may be implemented in the processor 102. The processor 102 may include an ASIC, other chipset, logic circuitry, and/or data processing device. The processor 102 may be an application processor. The processor 102 may include at least one of a DSP, a central processing unit (CPU), a graphics processing unit (GPU), and a modem (modulator and demodulator).

The memory 104 is operatively coupled to the processor 102, and stores various information for operating the processor 102. Memory 104 may include ROM, RAM, flash memory, memory cards, storage media, and/or other storage devices. When the implementation is implemented in software, the techniques described herein may be implemented using modules (e.g., procedures, functions, etc.) that perform the descriptions, functions, procedures, suggestions, methods, and/or operational flow diagrams disclosed herein. Modules may be stored in memory 104 and executed by processor 102. The memory 104 may be implemented within the processor 102 or external to the processor 102. In this case, it may be communicatively coupled to the processor 102 through various methods known in the art.

The transceiver 106 is operatively coupled with the processor 102 and transmits and/or receives wireless signals. The transceiver 106 includes a transmitter and a receiver. The transceiver 106 may include baseband circuitry for processing radio frequency signals. The transceiver 106 controls one or more antennas 108 to transmit and/or receive wireless signals.

The power management module 141 manages power of the processor 102 and/or the transceiver 106. The battery 142 supplies power to the power management module 141.

The display 143 outputs the result processed by the processor 102. Keypad 144 receives input for use by processor 102. The keypad 144 may be displayed on the display 143.

The SIM card 145 is an integrated circuit for securely storing an International Mobile Subscriber Identity (IMSI) and related keys, and is used to identify and authenticate subscribers in a mobile phone device such as a mobile phone or computer. It is also possible to store contact information on many SIM cards.

The speaker 146 outputs sound related results processed by the processor 102. Microphone 147 receives sound related input for use by processor 102.

Figure 5:
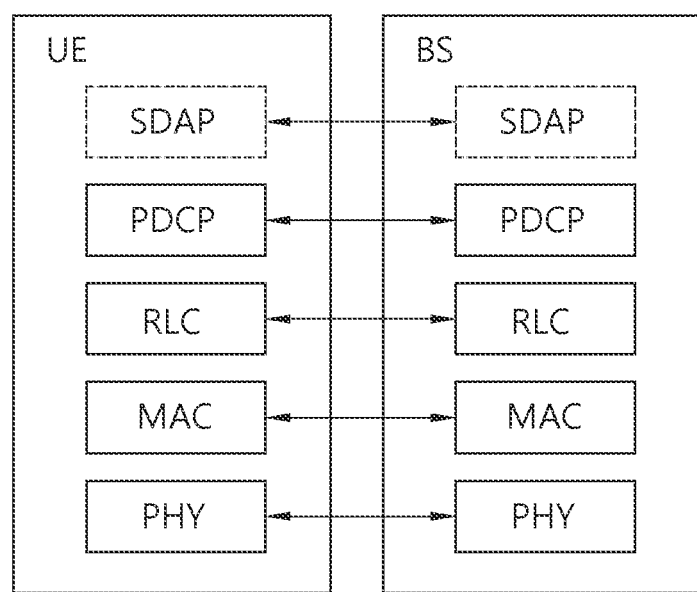
FIG. 5 shows an example of an air interface user plane protocol stack between a UE and a BS.

FIG. 5 shows an example of an air interface user plane protocol stack between a UE and a BS. Referring to FIG. 5, the user plane protocol stack may be divided into a layer 1 (i.e., a PHY layer) and a layer 2. The user plane refers to a path through which data generated in the application layer, for example, voice data or Internet packet data is transmitted.

Figure 6:
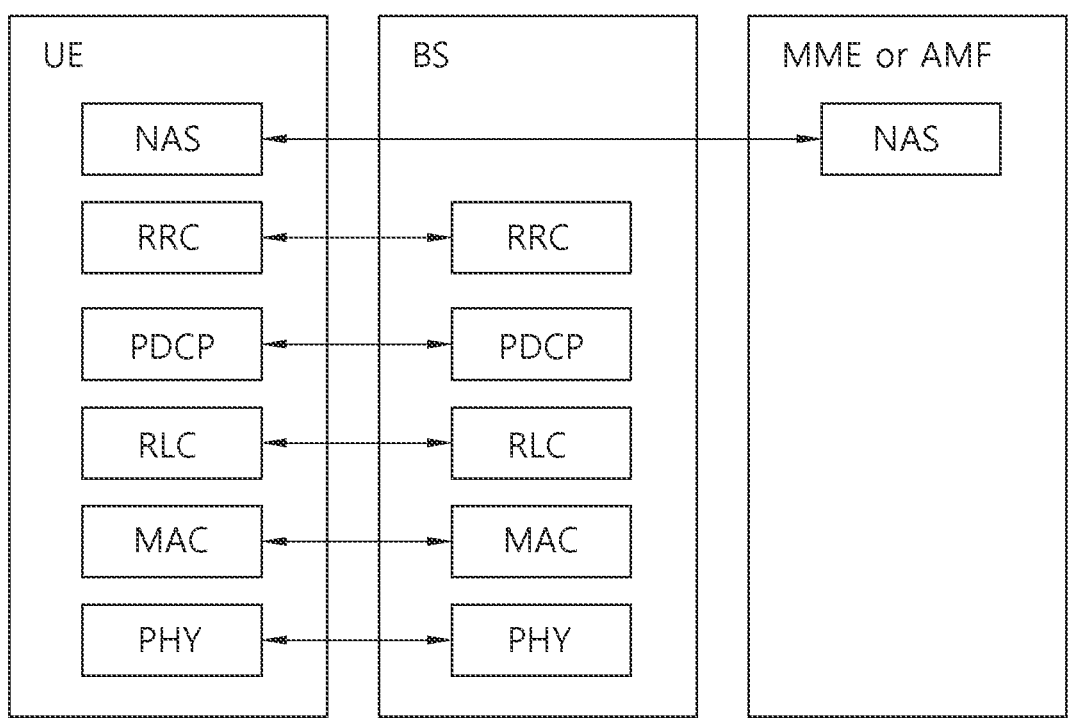
FIG. 6 shows an example of a radio interface control plane protocol stack between a UE and a BS.

FIG. 6 shows an example of a radio interface control plane protocol stack between a UE and a BS. The control plane refers to a path through which a control message used by the UE and the network to manage a call is transmitted.

Referring to FIG. 6, the control plane protocol stack may be divided into a layer I (i.e., a PHY layer), a layer 2, a layer 3 (e.g., an RRC layer), and a non-access stratum (NAS) layer. Layer 1. Layer 2, and Layer 3 are referred to as Access Stratum (AS).

In the 3GPP LTE system. Layer 2 is divided into sublayers of MAC. RLC, and PDCP. In the 3GPP NR system, Layer 2 is divided into sublayers of MAC. RLC, PDCP and SDAP. The PHY layer provides a transport channel to the MAC sublayer, the MAC sublayer provides a logical channel to the RLC sublayer, the RLC sublayer provides an RLC channel to the PDCP sublayer, and the PDCP sublayer provides a radio bearer to the SDAP sublayer. The SDAP sublayer provides QOS (Quality Of Service) flows to the SG core network.

The main services and functions of the MAC sublayer in the 3GPP NR system include mapping between logical channels and transport channels; multiplexing/demultiplexing MAC SDUs belonging to one or another logical channel to/from a Transport Block (TB) delivered to/from a physical layer on a transport channel: reporting scheduling information: error correction via Hybrid Automatic Repeat Request (HARQ) (one HARQ entity per cell in case of CA (Carrier Aggregation)); priority processing between UEs by dynamic scheduling; priority processing between logical channels of one UE by logical channel prioritization; and padding. A single MAC entity may support multiple numerologies, transmission timings and cells. Mapping constraints in logical channel prioritization control the numerologies, cells, and transmission timing that logical channels can use.

MAC provides various types of data transmission services. To accommodate different kinds of data transfer services, different types of logical channels are defined. That is, each logical channel supports the transmission of a specific type of information. Each logical channel type is defined according to the type of information being transmitted Logical channels are classified into two groups: control channels and traffic channels. The control channel is used only for transmission of control plane information, and the traffic channel is used only for transmission of user plane information. A Broadcast Control Channel (BCCH) is a downlink logical channel for broadcasting system control information. A Paging Control Channel (PCCH) is a downlink logical channel for transmitting paging information system information change notification, and indication of an ongoing Public Warning Service (PWS) broadcast. A common control channel (CCCH) is a logical channel for transmitting control information between a UE and a network, and is used for a UE without an RRC connection to the network. A DCCH (Dedicated Control Channel) is a point-to-point bidirectional logical channel for transmitting dedicated control information between a UE and a network, and is used by a UE having an RRC connection. A Dedicated Traffic Channel (DTCH) is a point-to-point logical channel dedicated to one UE for transmitting user information. DTCH may exist in both uplink and downlink. The following connection exists between the logical channel and the transport channel in the downlink. The BCCH may be mapped to a broadcast channel (BCH), the BCCH may be mapped to a downlink shared channel (DL-SCH), the PCCH may be mapped to a paging channel (PCH), and the CCCH may be mapped to the DL-SCH, DCCH may be mapped to DL-SCH, and DTCH may be mapped to DL-SCH. The following connection exists between the logical channel and the transport channel in the uplink. The CCCH may be mapped to an Uplink Shared Channel (UL-SCH), the DCCH may be mapped to the UL-SCH, and the DTCH may be mapped to the UL-SCH.

The RLC sublayer supports three transmission modes: TM (Transparent Mode), UM (Unacknowledged Mode), and AM (Acknowledged Mode). RLC configuration is done for each logical channel that does not depend on the numerology and/or transmission period. In the 3GPP NR system, the main services and functions of the RLC sublayer depend on the transmission mode, and include the transmission of the upper layer PDU: sequence numbering independent of that in PDCP (UM and AM): error correction via ARQ (AM only) RLC SDU splitting (AM and UM) and repartitioning (AM only); reassembly of SDUs (AM and UM): duplicate detection (AM only): RLC SDU discard (AM and UM): RLC re-establishment; and protocol error detection (AM only).

In the 3GPP NR system, the main services and functions of the PDCP sublayer for the user plane include: sequence numbering: header compression and decompression using ROHC (Robust Header Compression): user data transmission: reordering and duplicate detection; in-order delivery: PDCP PDU routing (for split bearers): retransmission of PDCP SDUs; encryption, decryption and integrity protection: PDCP SDU discard: PDCP re-establishment and data recovery for RLC AM: PDCP status report for RLC AM: replication of PDCP PDUs and indication of abort replication to lower layers. The main services and functions of the PDCP sublayer for the control plane include: sequence numbering: encryption, decryption and integrity protection: control plane data transmission; reordering and duplicate detection: delivery in order: replication of PDCP PDUs and indication of abort replication to lower layers.

The main services and functions of SDAP in the 3GPP NR system include: mapping between QoS flows and data radio bearers; an indication of QoS Flow ID (QFI) in both DL and UL packets. A single protocol entity in SDAP is configured for each individual PDU session.

In the 3GPP NR system, the main services and functions of the RRC sublayer include: broadcasting of system information related to AS and NAS: paging initiated by 5GC or NG-RAN; establishment, maintenance and release of RRC connection between the UE and the NG-RAN: security features including key management: establishment, configuration, maintenance and release of a Signaling Radio Bearer (SRB) and a Data Radio Bearer (DRB); mobility functions (including handover and context transfer. UE cell selection and reselection and control of cell selection and reselection, inter-RAT mobility); QoS management function: UE measurement report and report control; detection and recovery of radio link failures; sending NAS messages to/from the UE to/from the NAS.

Figure 7:
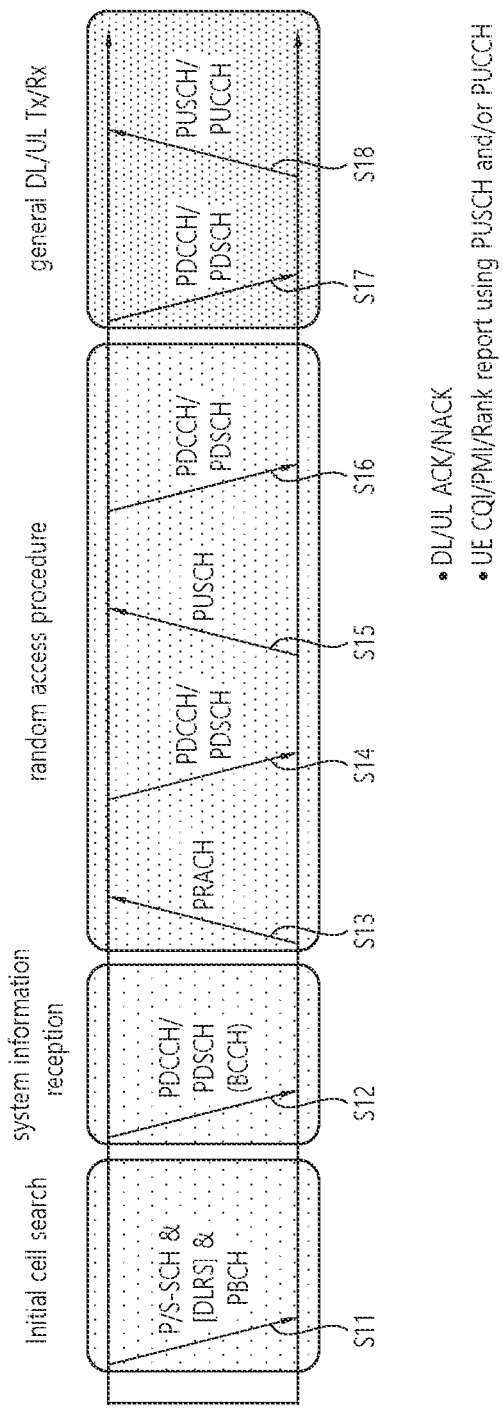
FIG. 7 illustrates physical channels and general signal transmission used in a 3GPP system.

FIG. 7 illustrates physical channels and general signal transmission used in a 3GPP system.

Referring to FIG. 7, in a wireless communication system, a UE receives information from a base station through a downlink (DL), and the UE transmits information to a base station through an uplink (UL). The information transmitted and received between the base station and the UE includes data and various control information, and various physical channels exist according to the type/use of the information they transmit and receive.

When the UE is powered on or newly enters a cell, the UE performs an initial cell search operation such as synchronizing with the base station (S11). To this end, the UE receives a primary synchronization signal (PSS) and a secondary synchronization signal (SSS) from the base station, synchronizes with the base station, and obtains information such as a cell ID. Thereafter, the UE may receive a physical broadcast channel (PBCH) from the base station to obtain intra-cell broadcast information. Meanwhile, the UE may receive a downlink reference signal (DL RS) in the initial cell search step to check the downlink channel state.

After the initial cell search, the UE may receive a Physical Downlink Control Channel (PDCCH) and a Physical Downlink Control Channel (PDSCH) according to information carried on the PDCCH to obtain more specific system information (S12).

On the other hand, when accessing the base station for the first time or there is no radio resource for signal transmission, the UE may perform a random access procedure (RACH) to the base station (S13 to S16). To this end, the UE transmits a specific sequence as a preamble through a Physical Random Access Channel (PRACH) (S13 and S15), a response message ((Random Access Response (RAR) message) for the preamble may be received through the PDCCH and the corresponding PDSCH. In the case of contention-based RACH, a contention resolution procedure may be additionally performed (S16).

After performing the procedure as described above, the UE may perform PDCCH/PDSCH reception (S17) and Physical Uplink Shared Channel (PUSCH)/Physical Uplink Control Channel (PUCCH) transmission (S18) as a general uplink/downlink signal transmission procedure. In particular, the UE may receive downlink control information (DCI) through the PDCCH. Here, the DCI includes control information such as resource allocation information for the UE, and different formats may be applied according to the purpose of use.

On the other hand, the control information transmitted by the UE to the base station through the uplink or received by the UE from the base station is a downlink/uplink ACK/NACK signal, a channel quality indicator (CQI), a precoding matrix index (PMI), and a rank indicator (RI) and the like. The UE may transmit the above-described control information such as CQU/PMI/RI through PUSCH and/or PUCCH.

<Structure of Uplink and Downlink Channels>
1. Downlink Channel Structure

The base station may transmit a related signal to the UE through a downlink channel to be described later, and the UE may receive a related signal from the base station through a downlink channel to be described later.

(1) Physical Downlink Shared Channel (PDSCH)

PDSCH carries downlink data (e.g., DL-shared channel transport block. DL-SCH TB), and modulation methods such as Quadrature Phase Shift Keying (QPSK), 16 Quadrature Amplitude Modulation (QAM), 64 QAM, and 256 QAM are applied to the PDSCH. A codeword is generated by encoding a transport block (TB). A PDSCH can carry multiple codewords. Scrambling and modulation mapping are performed for each codeword, and modulation symbols generated from each codeword are mapped to one or more layers (Layer mapping). Each layer is mapped to a resource together with a demodulation reference signal (DMRS), is generated as an OFDM symbol signal, and is transmitted through a corresponding antenna port.

(2) Physical Downlink Control Channel (PDCCH)

The PDCCH carries downlink control information (DCI) and a QPSK modulation method is applied. One PDCCH is composed of 1, 2, 4. 8, 16 CCEs (Control Channel Elements) according to an Aggregation Level (AL). One CCE consists of six REGs (Resource Element Groups). One REG is defined as one OFDM symbol and one (P) RB.

The UE obtains DCI transmitted through the PDCCH by performing decoding (also known as, blind decoding) on a set of PDCCH candidates. A set of PDCCH candidates decoded by the UE is defined as a PDCCH search space set. The search space set may be a common search space or a UE-specific search space. The UE may acquire DCI by monitoring PDCCH candidates in one or more search space sets configured by MIB or higher layer signaling.

2. Uplink Channel Structure

The UE transmits a related signal to the base station through an uplink channel to be described later, and the base station receives the related signal from the UE through an uplink channel to be described later.

(1) Physical Uplink Shared Channel (PUSCH)

PUSCH carries uplink data (e.g., UL-shared channel transport block, UL-SCH TB) and/or uplink control information (UCI), and is transmitted based on the waveform such as CP-OFDM (Cyclic Prefix-Orthogonal Frequency Division Multiplexing) waveform, DFT-s-OFDM (Discrete Fourier Transform-spread-Orthogonal Frequency Division Multiplexing) waveform, etc. When the PUSCH is transmitted based on the DFT-s-OFDM waveform, the UE transmits the PUSCH by applying transform precoding. For example, when transform precoding is not possible (e.g., transform precoding is disabled), the UE transmits a PUSCH based on a CP-OFDM waveform, and when transform precoding is possible (e.g., transform precoding is enabled), the UE may transmit a PUSCH based on a CP-OFDM waveform or a DFT-s-OFDM waveform. PUSCH transmission is dynamically scheduled by a UL grant in DCI, or may be semi-statically scheduled (configured grant) based on higher layer (e.g., RRC) signaling (and/or Layer 1 (L1) signaling (e.g., PDCCH)). PUSCH transmission may be performed on a codebook-based or non-codebook-based basis.

(2) Physical Uplink Control Channel (PUCCH)

The PUCCH carries uplink control information, HARQ-ACK, and/or a scheduling request (SR), and may be divided into a plurality of PUCCHs according to a PUCCH transmission length.

Figure 8:
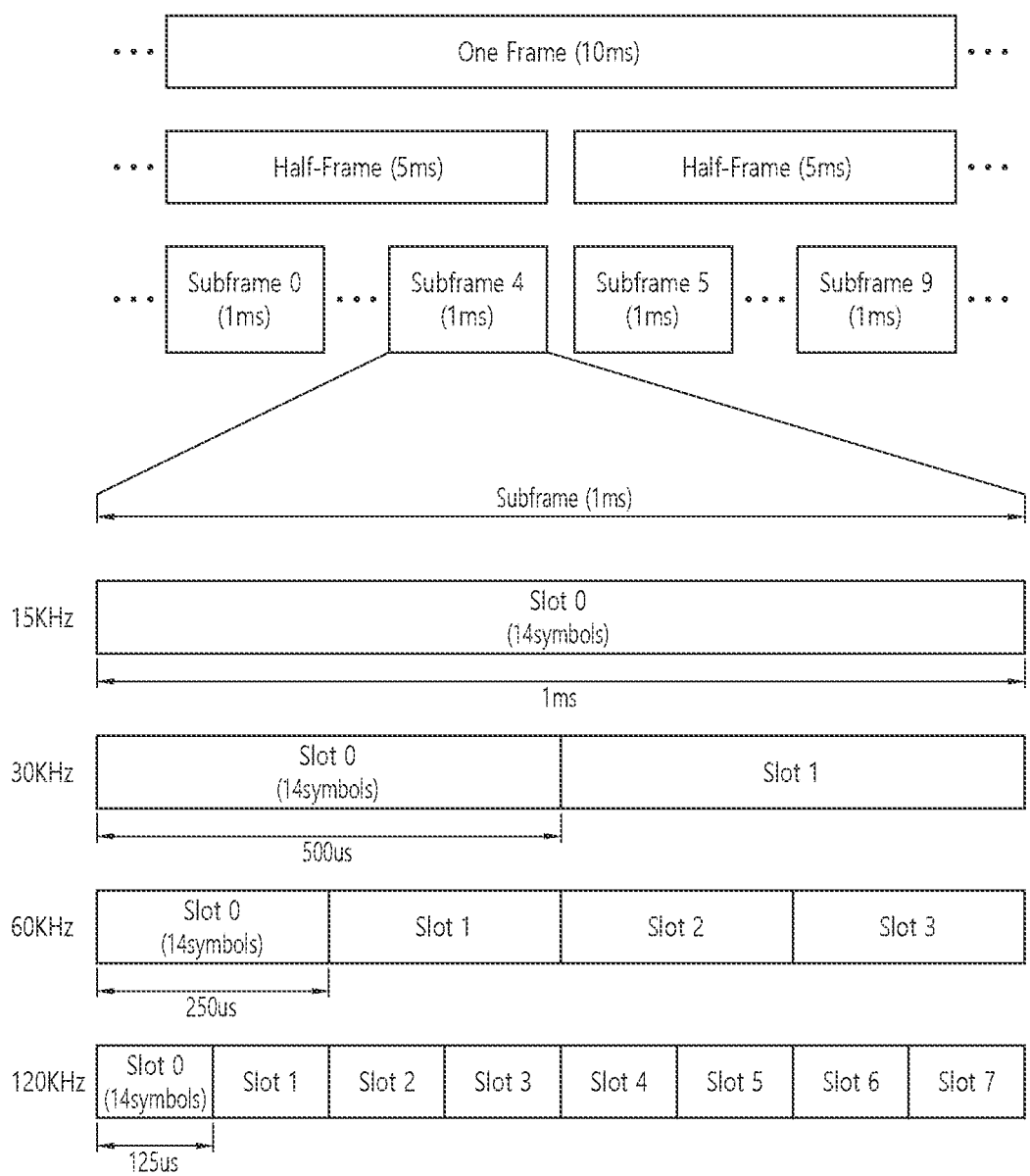
FIG. 8 shows an example of a frame structure in a 3GPP-based wireless communication system.

FIG. 8 shows a frame structure in a 3GPP-based wireless communication system.

The frame structure shown in FIG. 8 is purely exemplary, and the number of subframes, the number of slots, and/or the number of symbols in the frame may be variously changed. In a 3GPP-based wireless communication system, OFDM numerology (e.g., Sub-Carrier Spacing (SCS), Transmission Time Interval (TTI) period) may be set differently between a plurality of cells aggregated for one UE. For example, when the UE is set to different SCS for an aggregated cell, the (absolute time) duration of a time resource (e.g., subframe, slot, or TTI) including the same number of symbols may be different between aggregated cells. Here, the symbol may include an OFDM symbol (or a CP-OFDM symbol) and an SC-FDMA symbol (or a Discrete Fourier Transform-Spread-OFDM (DFT-s-OFDM) symbol).

Referring to FIG. 8, downlink and uplink transmission are configured in frames. Each frame may have a duration of, for example, $T_f=10$ ms. Each frame may consist of two half-frames, and the duration of each half-frame is 5 ms. Each half frame consists of 5 subframes, and the duration $T_{sf}$ per subframe is 1 ms. Each subframe is divided into slots, and the number of slots in the subframe varies according to the subcarrier spacing. Each slot includes 14 or 12 OFDM symbols based on CP (Cyclic Prefix). In the normal CP, each slot includes 14 OFDM symbols, and in the extended CP, each slot includes 12 OFDM symbols. Numerology is based on an exponentially scalable subcarrier spacing $\Delta f=2^u*15$ kHz.

Table 3 shows the number of OFDM symbols per slot $N^{slot}_{symb}$, the number of slots per frame $N^{frame,u}_{slot}$, and the number of slots per subframe $N^{subframe,u}_{slot}$ for a normal CP according to the subcarrier spacing $\Delta f=2^u*15$ kHz.

TABLE 3

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 4 shows the number of OFDM symbols per slot $N^{slot}_{symb}$ for the extended CP, the number of slots per frame $N^{frame,u}_{slot}$, and the number of slots per subframe $N^{subframe,u}_{slot}$ according to the subcarrier spacing $\Delta f=2^u*15$ kHz.

TABLE 4

| u | $N^{slot}_{symb}$ | $N^{frame,u}_{slot}$ | $N^{subframe,u}_{slot}$ |
|---|---|---|---|
| 2 | 12 | 40 | 4 |

A slot includes a plurality of symbols (e.g., 14 or 12 symbols) in the time domain. For each numerology (e.g. subcarrier spacing) and carrier, a resource grid of $N^{size,u}_{grid,x}*N^{RB}_{sc}$ subcarriers and $N^{subframe,u}_{symb}$ OFDM symbols starting from Common Resource Block (CRB) $N^{start,u}_{grid}$ indicated by higher layer signaling (e.g., RRC signaling) is defined. Here, $N^{size,u}_{grid,x}$ is the number of resource blocks (RBs) in the resource grid, and the subscript x is DL for downlink and UL for uplink. $N^{RB}_{sc}$ is the number of subcarriers per RB. In a 3GPP based wireless communication system. $N^{RB}_{sc}$ is generally 12. There is one resource grid for a given antenna port p, subcarrier spacing configuration u, and transmission direction (DL or UL). The carrier bandwidth $N^{size,u}_{grid}$ for the subcarrier spacing configuration u is given by a higher layer parameter (e.g., RRC parameter). Each element of the resource grid for the antenna port p and the subcarrier spacing configuration u is called a resource element (RE), and one complex symbol may be mapped to each RE. Each RE in the resource grid is uniquely identified by an index k in the frequency domain and an index l indicating a symbol position with respect to a reference point in the time domain.

Figure 9:
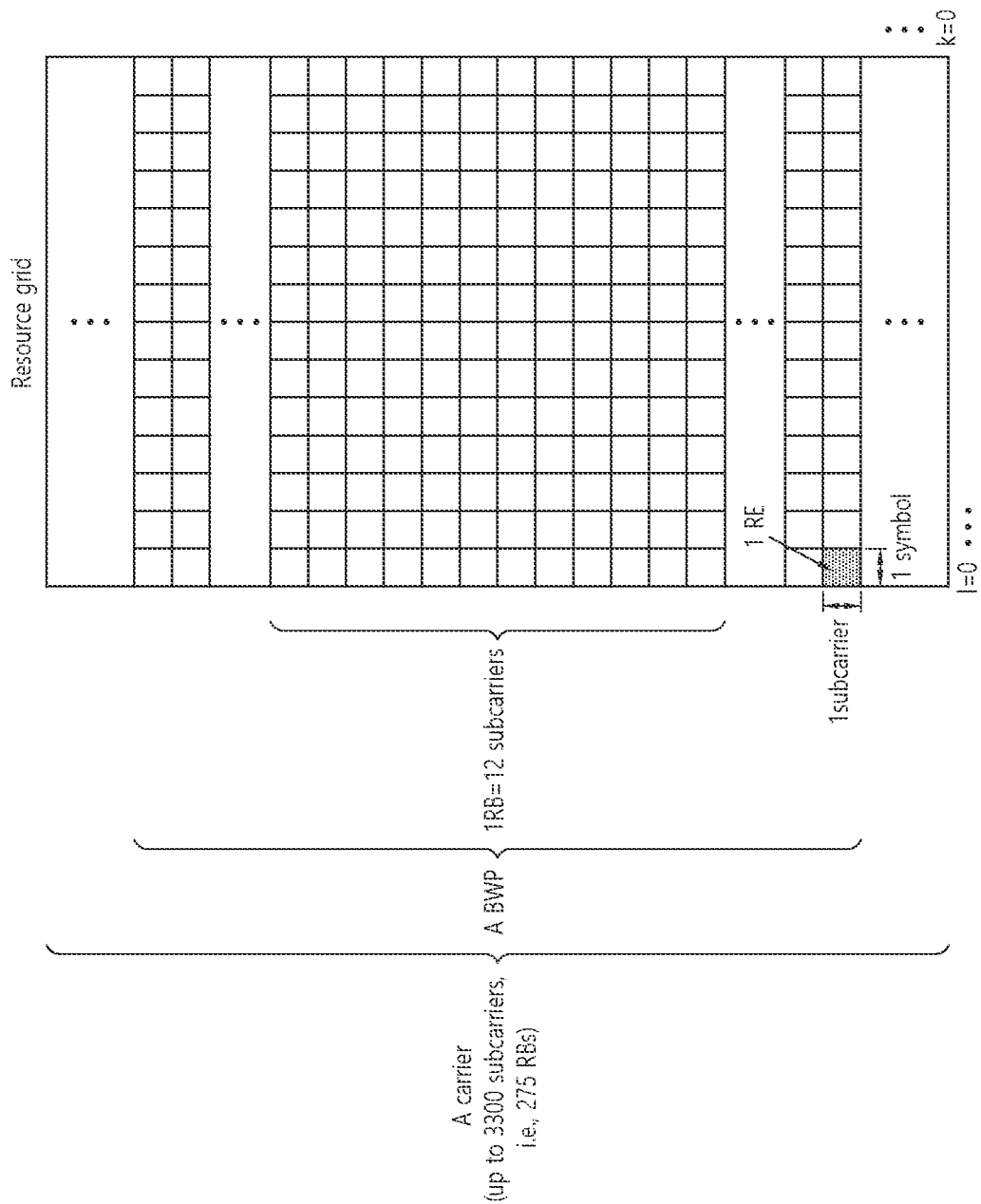
FIG. 9 shows an example of a slot structure of a frame.

FIG. 9 illustrates the slot structure of a frame.

Referring to FIG. 9, a slot includes a plurality of symbols in the time domain. For example, in the case of a normal CP, one slot may include 14 symbols, but in the case of an extended CP, one slot may include 12 symbols. Alternatively, in the case of a normal CP, one slot may include 7 symbols, but in the case of an extended CP, one slot may include 6 symbols.

A carrier includes a plurality of subcarriers in the frequency domain. A resource block (RB) may be defined as a plurality of (e.g., 12) consecutive subcarriers in the frequency domain. BWP (Bandwidth Part) may be defined as a plurality of consecutive (P) RB ((Physical) Resource Block) in the frequency domain, and may correspond to one numerology (e.g., SCS, CP length, etc.). A carrier may include a maximum of N (e.g., 5) BWPs. Data communication may be performed through the activated BWP. Each element may be referred to as a resource element (RE) in the resource grid, and one complex symbol may be mapped.

In a 3GPP-based wireless communication system, an RB is defined as 12 consecutive subcarriers in a frequency domain. In the 3GPP NR system, the RB is divided into a CRB and a physical resource block (PRB). CRBs are numbered in increasing direction from 0 in the frequency domain for the subcarrier spacing configuration u. The center of subcarrier 0 of CRB 0 for subcarrier spacing configuration u coincides with 'point A', which serves as a common reference point for the resource block grid. In the 3GPP NR system, PRBs are defined within a BandWidth Part (BWP) and are numbered from 0 to $N^{size}_{BWP,i}-1$. Here, i is the BWP number. The relationship between PRB nPRB and CRB nCRB of BWP i is as follows, $n_{PRB}=N_{CRB}+N^{size}_{BWP,i}$, Where $N^{size}_{BWP,i}$ is the CRB whose BWP starts with CRB 0. The BWP includes a plurality of consecutive RBs. A carrier may contain up to N (e.g., 5) BWPs. The UE may be configured with one or more BWPs on a given CC. Among the BWPs set in the UE, only one BWP may be activated at a time. Active BWP defines the operating bandwidth of the UE within the operating bandwidth of the cell.

In the PHY layer, the uplink transport channels UL-SCH and RACH (Random Access Channel) are mapped to physical channels PUSCH (Physical Uplink Shared Channel) and PRACH (Physical Random Access Channel), respectively, and downlink transport channels DL-SCH, BCH, and PCH are mapped to a Physical Downlink Shared Channel (PDSCH), a Physical Broadcast Channel (PBCH), and a PDSCH, respectively. In the PHY layer. Uplink Control Information (UCI) is mapped to a Physical Uplink Control Channel (PUCCH), Downlink Control Information (DCI) is mapped to a Physical Downlink Control Channel (PDCCH). A MAC PDU related to UL-SCH is transmitted by a UE through a PUSCH based on a UL grant, and a MAC PDU related to DL-SCH is transmitted by a BS through a PDSCH based on DL allocation.

Hereinafter, the following abbreviations may be used.

AMC: Adaptive Modulation and Coding, AR: Augmented Reality, ARQ: Automatic Repeat request, BER: Bit Error Rate, BLER: Block Error Rate, CB: Code Block, CBG: Code Block Group. CC: Chase Combining, CE: Control Element. CQI: Channel Quality Indicator, CR: Coding Rate, CRC: Cyclic Redundancy Check, CSI: Channel State Information, DCI: Downlink Control Information, DL: Down-Link, DL-SCH: Downlink Shared Channel, HARQ: Hybrid Automatic Repeat request, ID: Identifier. IR: Incremental Redundancy, L1: Layer 1, LCG: Logical Channel Group, LTE: Long-Term Evolution. MAC: Medium Access Control. MCS: Modulation and Coding Scheme. MIMO: Multiple Input Multiple Output, NDI: New Data Indicator, NR: New Radio. PDCCH: Physical Downlink Control Channel, PDSCH: Physical Downlink Shared Channel, PDU: Packet Data Unit, PTB: Primary Transport Block, PUCCH: Physical Uplink Control Channel. PUSCH: Physical Uplink Shared Channel. QoS: Quality of Service, RA: Resource Assignment. RLC: Radio Link Control, RV: Redundancy Version. SDU: Service Data Unit. SINR: Signal to Interference and Noise Ratio, SNS: Social Networking Service, STB: Secondary Transport Block, TB: Transport Block, TTI: Transmit Time Interval, UL: UpLink, UL-SCH: Uplink Shared Channel, VR: Virtual Reality.

The present disclosure relates to a wireless transmission apparatus, method, and procedure for efficiently providing a plurality of services requiring different QoS or one service requiring various QoS to one UE in a wireless communication system.

In 4G LTE and 5G NR radio access networks, QOS is managed by DRB (Data Radio Bearer). The RLC and MAC layers control transmission quality for each logical channel corresponding to each DRB. The MAC may transmit by multiplexing a plurality of logical channels into one transport channel. When there are two or more logical channels, the MAC performs scheduling according to priority to generate a MAC PDU and then delivers it to the physical layer (PHY). The physical layer (PHY) uses one MAC PDU as one transport block (TB), adds a CRC, and transmits it through a physical channel such as PDSCH or PUSCH after channel coding.

In general, depending on radio link quality such as the target transmission quality (BLER, etc.), transmission delay time, and Signal to Interference plus Noise Ratio (SINR), a transmission scheme such as the transmission duration and interval (Transmit Time Interval, TTI) and a modulation and coding scheme (MCS) is determined.

Figure 10:
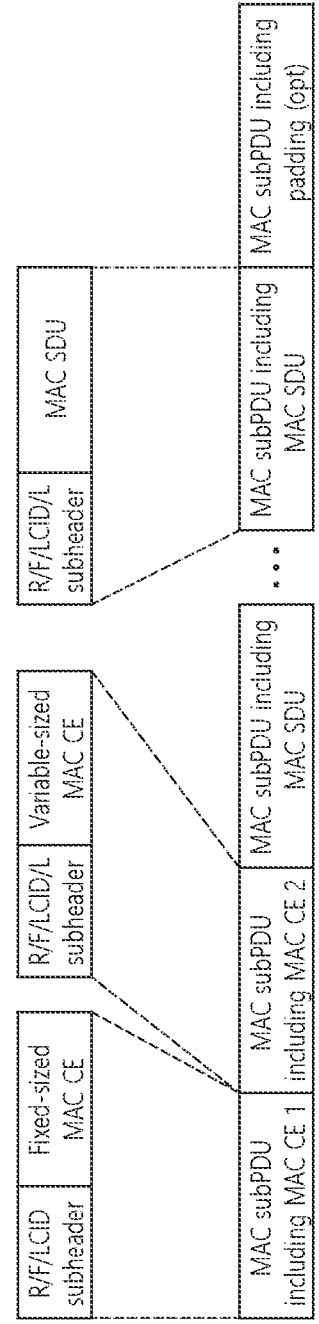
FIG. 10 shows an example of a MAC PDU of 5G NR downlink.

FIG. 10 shows an example of a MAC PDU of 5G NR downlink.

Figure 11:
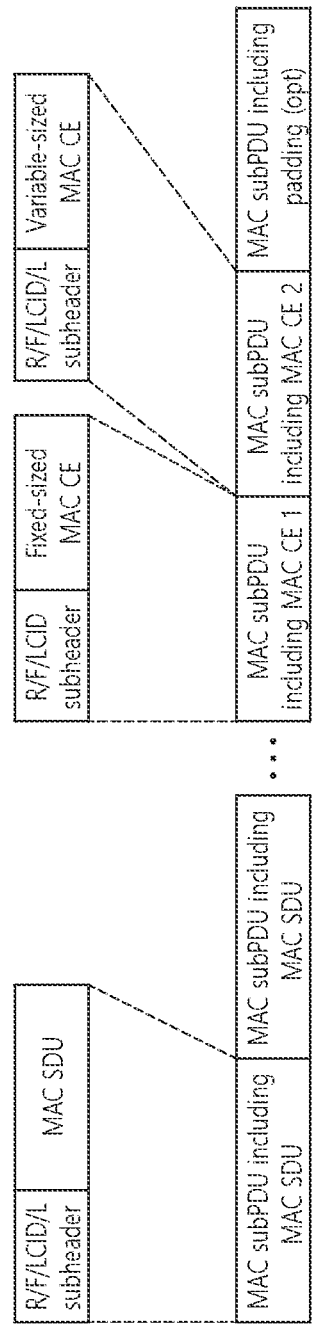
FIG. 11 shows an example of a MAC PDU of 5G NR uplink.

FIG. 11 shows an example of a MAC PDU of 5G NR uplink.

Referring to FIGS. 10 and 11, a MAC PDU includes one or more MAC subPDUs. Each MAC subPDU is composed of a MAC subheader and a MAC Control Element (CE), or a MAC subheader and a MAC SDU, or a MAC subheader and padding of 0 bytes or more.

A wireless access network uses various transmission techniques to maintain transmission quality even in a radio wave environment that changes due to movement of a UE or a change in a channel state. Representative transmission techniques include adaptive modulation and coding (AMC) and hybrid automatic repeat request (HARQ).

Adaptive modulation and coding (AMC) is a technology for selecting and transmitting an appropriate modulation and coding scheme (MCS) according to radio link quality. When the UE measures the SINR and reports a channel quality indicator (CQI) to the base station, the base station selects and transmits an appropriate modulation order, coding method, code rate, etc. according to the channel state.

By selecting an MCS appropriate for the channel quality and transmitting, the data transmission amount is increased while effectively lowering the error rate. However, even if AMC is applied, there is still a possibility that an error may occur in one transmission, and there is a limit in that the required resource is greatly increased in order to lower the error rate to a very low level. To remedy this problem, it is common to use Hybrid Automatic Repeat reQuest (HARQ) with AMC.

HARQ is a combination of Forward Error Correction (FEC) and Automatic Repeat request (ARQ). The transmitter transmits data encoded with a forward error correction code. The receiver decodes the received signal to check whether there is an error in the data transport block, and if an error is detected, it requests retransmission from the transmitter. The transmitter retransmits the data encoded with the forward error correction code, and the receiver reduces the error probability by increasing the coding gain by combining a previously received signal and a newly received signal. When retransmitting, there is Chase Combining (CC), which transmits the same encoded data as previously transmitted, and Incremental Redundancy (IR), which transmits the encoded data including new parity bits. IR is a bit more complicated than CC, but has good performance.

As the transmission speed of a communication system increases and the size of a transport block increases, a technique for dividing one transport block into several code blocks (CBs) and transmitting has been developed in order to increase retransmission efficiency. The transmitter transmits not only the entire transport block but also each code block with CRC attached, and the receiver checks the CRC for each code block and requests retransmission only for the code block in which an error occurs, thereby saving radio resources required for retransmission and improving transmission efficiency.

However, since it is necessary to transmit whether or not retransmission is required for each code block from the receiver to the transmitter, there is a disadvantage in that radio resources required for this need to be increased. In 5G NR, as the transmission rate increases, the size of the transport block becomes larger, which further increases the number of code blocks and the amount of retransmission request information. Therefore, a method of creating a code block group (CBG) by grouping several code blocks and retransmitting the code block group unit was introduced.

Figure 12:
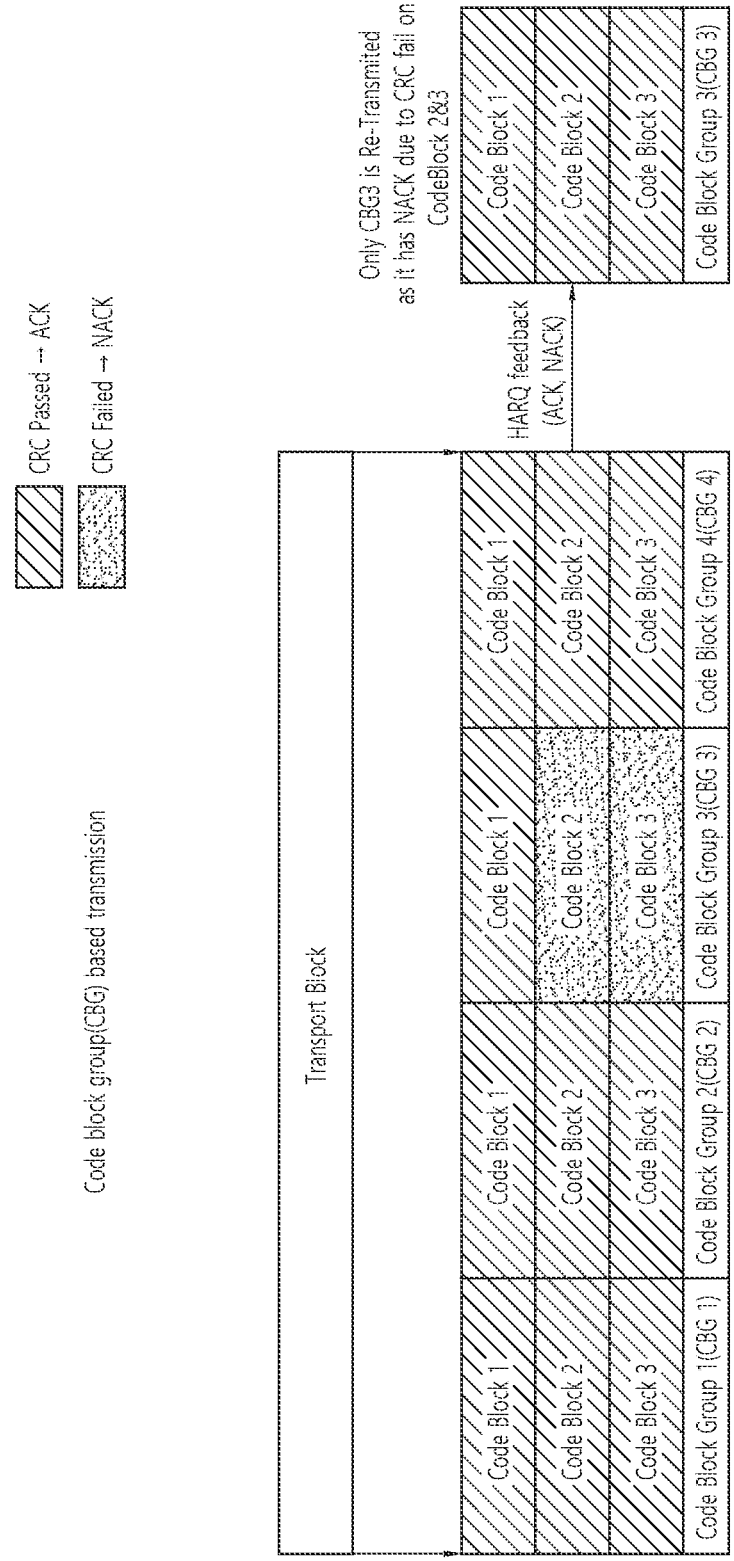
FIG. 12 shows an example of a transmission scheme based on code block group (CBG) in 5G NR.

FIG. 12 shows an example of a transmission scheme based on a code block group (CBG) in 5G NR.

Referring to FIG. 12, a transport block may include, for example, four CBGs, i.e., CBG1, CBG2, CBG3, and CBG4.

After transmitting the transport block, ACK/NACK for each of the four CBGs may be received. For example, ACKs may be received for CBG1, CBG2, and CBG4, and a NACK may be received for CBG3. (For example, a CRC failure for code blocks 2 and 3 of CBG3 may occur to receive a NACK for CBG3). In this case, only CBG3 may be retransmitted without retransmitting the entire transport block.

The base station and the UE may share information on the transmission scheme through an RRC message, a MAC control element (CE), and a physical channel such as a PDCCH. In particular, in order to quickly respond to changes in the channel environment, it is common to exchange AMC and HARQ information through the PDCCH. Since the PDCCH includes essential information for transmitting data through the PDSCH and the PUSCH, it is designed to have high transmission reliability even though the transmission efficiency is somewhat lowered. As wireless transmission technology develops and becomes more complex, control information transmitted through the PDCCH also tends to increase.

With the development of wireless communication technology and user UEs, there is an increasing need to provide various services requiring different QoS to one UE or to provide one service composed of functions requiring various QoS. As an example of the former, a smartphone user may use an SNS or perform an Internet search while watching a video. As an example of the latter, in the case of an AR/VR service, the data transmission speed and delay time required for visual data and auditory data may be different from each other.

Meanwhile, as various types of devices, including autonomous vehicles, as well as devices directly used by humans, such as smartphones, require wireless communication functions, the number of UEs accessing the wireless communication network is rapidly increasing. Accordingly, the need for a wireless access technology capable of supporting multiple QoS transmission to a large number of UEs is increasing.

In conventional radio access technologies such as 4G LTE and 5G NR, all data included in one transport block is transmitted using the same transmission scheme (MCS, HARQ parameters, etc.). Although the transmission quality (BLER, delay time, etc.) required for each logical channel is different, all logical channels have the same transmission quality physically.

In this transmission method, there may be no major problem when the size of the transport block is small, but when the size of the transport block is large, the transmission efficiency and transmission quality may be deteriorated as follows.

First, it may be difficult to efficiently allocate radio resources. In order to obtain the target BLER required by all logical channels, the MCS should be selected based on the lowest target BLER. This results in allocating excessive radio resources to a logical channel requiring a high target BLER. Conversely, if the MCS is selected based on a high target BLER, the BLER increases, resulting in a transmission delay of data requiring a low BLER or, in the worst case, transmission failure. If transmission failure occurs in the physical layer, additional radio resources are required and transmission delay is greatly increased because recovery is required by the ARQ procedure of an upper layer such as RLC.

Second, when an error occurs in some code blocks, transmission delay increases because the entire transport block cannot be transferred to a higher layer. For example, when logical channel A requiring low transmission delay and logical channel B which is relatively insensitive to transmission delay are transmitted in one transport block, even if all code blocks and code block groups including logical channel A are received without error, if there is an error in the code block or code block group including logical channel B, the data of logical channel A cannot be delivered to the MAC layer.

The average transmission delay of logical channel A increases because the entire transport block can be delivered to the MAC layer when errors of all code blocks and code block groups including logical channel B are corrected by retransmission.

Transmission delay due to errors in some code blocks increases as the size of the transport block increases. When a transport block becomes large, it is divided into a plurality of code blocks and transmitted. This is because, as the number of code blocks increases, the probability that the entire transport block (i.e., all code blocks) is transmitted without errors in the first transmission decreases.

When the transport block is divided into NeB code blocks and transmitted, and the BLER of each code block is $BLER_{CB,i}$, the error probability $BLER_{TB}$ of the transport block in the first transmission can be expressed as follows.

$$BLER_{TB} = 1 - \sum_{i=1}^{N_{CB}} (1 - BLER_{CB,i})$$ [Equation 1]

As the number of code blocks increases, the probability that the entire transport block (i.e., all code blocks) is transmitted without errors in the first transmission decreases. This problem can be solved by separating logical channels requiring different QoS and transmitting them in a plurality of transport blocks. However, when this method is applied, there is a problem in that control channels (PDCCH, etc.) as many as the number of transport blocks should be used. The control channel is not a channel for transmitting actual data, but an additional channel for transmitting data. Accordingly, an increase in resources allocated to the control channel may result in a decrease in overall system capacity.

In addition, since the number of control channels and data transmission channels to be processed within one TTI increases in the UE, system complexity and power consumption may increase. These problems are expected to become more important as the number of services simultaneously supported by one UE increases and the number of UEs that should be simultaneously supported in a wireless communication network increases.

The present disclosure describes an apparatus, method and procedure for transmitting a plurality of logical channels (more specifically multiple TBs containing logical channels) requiring different QoS through a shared channel (e.g., PDSCH, PUSCH) corresponding to control information (e.g., DCI) transmitted through one control channel (e.g., PDCCH). Hereinafter, transmitting a logical channel may mean transmitting a TB including data/information of the logical channel.

When a plurality of logical channels different in QoS are transmitted one shared channel, in order to efficiently use radio resources according to the QoS of each logical channel, logical channels with similar QoS can create a transport block (TB) and apply MCS differently.

In this case, a plurality of TBs to which different MCSs are applied are transmitted through one shared channel. At this time, since the MCS for each of the plurality of TBs needs to be informed, there is a problem in that the size of the DCI for scheduling the plurality of TBs increases. Accordingly, there is a need for a method capable of minimizing an increase in the size of the DCI.

Figure 13:
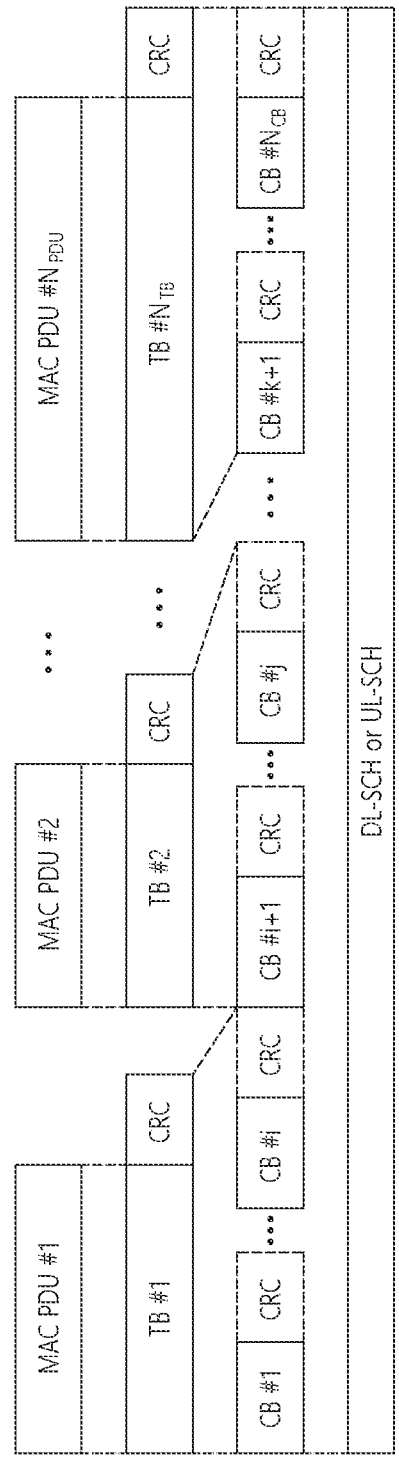
FIG. 13 is an example of a MAC/PHY transmission structure for multiple QoS data transmission.

FIG. 13 is an example of a MAC/PHY transmission structure for multiple QoS data transmission.

That is, it is an example of a MAC and PHY transmission structure in which a plurality of logical channels having different QoS are transmitted through a plurality of TBs.

Referring to FIG. 13, logical channels having similar required QoS may be transmitted through one MAC PDU and a corresponding TB. Logical channels with different QoS may be transmitted through different MAC PDUs and corresponding TBs.

For example, high QoS may be requested in the order of logical channel 1, logical channel 3, and logical channel 2. In this case, data of logical channel 1 requiring the highest QoS is transmitted through MAC PDU #1 (and its corresponding TB #1), and data of logical channel 3 requiring the next highest QoS is transmitted through MAC PDU #2 (and its corresponding TB #2) and data of logical channel 2 requiring the lowest QoS may be transmitted through MAC PDU #3 (and its corresponding TB #3).

Since each TB is transmitted together with a CRC for each TB, a TB in which a transmission error does not occur can be directly transferred to a higher layer regardless of whether or not a transmission error occurs in other TBs.

Each TB may include one or more code blocks (Code Blocks. CBs). One CB may include only data belonging to one TB, and may not include data belonging to two or more TBs. Each CB may be transmitted together with a CRC for each CB.

As shown in FIG. 13, in order to transmit a plurality of TBs by applying different MCSs according to required QoS, the size of each TB and MCS information should be shared between the transmitter and the receiver. In a communication system such as 4G LTE and 5G NR, such information may be transmitted through a control channel such as PDCCH. If the size of control information (e.g., DCI) transmitted through the control channel increases, the overall system capacity may decrease, a transmission structure capable of efficiently delivering the size of each TB and MCS information is required.

In 4G LTE and 5G NR, the size of the TB (transport block size: TBS) may be calculated by the size of the resource allocated by the base station and the MCS. The size of the allocated resource is determined by the number of subcarriers in the frequency domain and the number of OFDM symbols in the time domain. Therefore, when transmitting a plurality of TBs as shown in FIG. 13, the base station allocates resources for each TB in units of OFDM symbols and informs the UE of the number of allocated OFDM symbols so that the UE can calculate the TB size.

Figure 14:
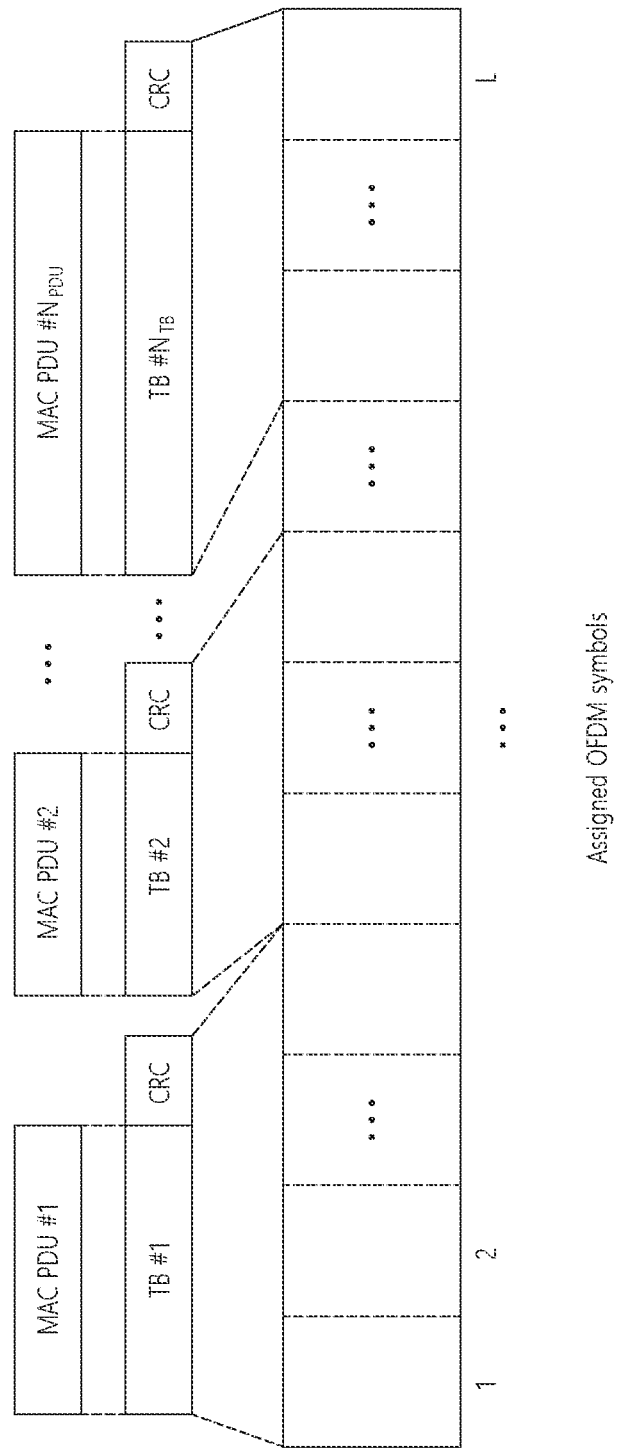
FIG. 14 shows an example of transmitting a plurality of TBs with one or more OFDM symbols for each TB.

FIG. 14 shows an example of transmitting a plurality of TBs through one or more OFDM symbols for each TB.

Referring to FIG. 14, when NTB TBs are transmitted with L allocated OFDM symbols, each TB may be transmitted with one or more integer OFDM symbols.

Conventionally, when a plurality of transport blocks are transmitted in one TTI, it has to be transmitted with rank 2 or higher. That is, only when transmitting through a plurality of transmit antennas (when the number of layers is a plurality), it is possible to transmit, for example, two transport blocks in one TTI. The rank indicates the number of paths capable of independently transmitting a signal, and the rank is less than or equal to the smaller of the number of transmit antennas and the number of receive antennas. The rank may indicate the number of independent (spatially separated) layers (streams) transmitted in a multi-antenna system. A coded transport block is called a codeword, because in the prior art, codewords are mapped to different layers and transmitted through the same resource region. On the other hand, in the present disclosure, a plurality of transport blocks may be transmitted even in rank 1 transmission. This is because, as shown in FIG. 14, transport blocks are mapped to different resources in the TTI and transmitted.

On the other hand, when each TB is transmitted in symbol units as shown in FIG. 14, the total data size of logical channels to be transmitted to any TB may be smaller than the size of the TB. In this case, logical channels having a target BLER higher than the target BLER of the TB may be transmitted together in the TB.

Figure 15:
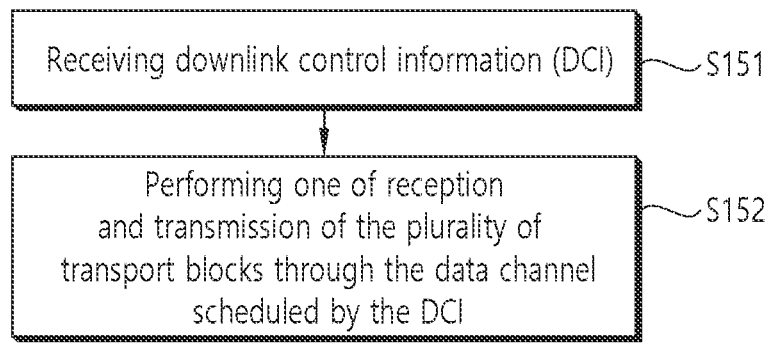
FIG. 15 illustrates a transport block processing method of a UE according to an embodiment of the present disclosure.

FIG. 15 illustrates a transport block processing method of a UE according to an embodiment of the present disclosure.

Referring to FIG. 15, the UE receives downlink control information (DCI) (S151). The DCI is received through a physical downlink control channel (PDCCH). The DCI may include information indicating an MCS applied to each of the plurality of transport blocks and information indicating a resource allocated to each of the plurality of transport blocks.

According to an embodiment, the DCI may include a transport block transmission information (TBTI) field indicating whether to transmit each transport block.

The UE performs one of reception and transmission of the plurality of transport blocks through the data channel scheduled by the DCI (S512).

When the UE performs one of reception and transmission of the plurality of transport blocks, a transport block having the highest required quality of service (QoS) among the plurality of transport blocks is received or transmitted.

When the base station transmits a plurality of TBs (TB1, TB2. TB3) in one TTI in downlink (or when the UE transmits a plurality of TBs in one TTI in uplink), the MCS having the relatively lowest MCS index may be applied to the TB (e.g., TB1) having the highest required QoS, and may be transmitted first in time. The MCS having the next lowest MCS index is applied to the TB having the next highest required QoS (e.g., TB2) and transmitted after TB1. The MCS having the next lowest MCS index is applied to the TB having the next highest required QoS (e.g., TB3) and transmitted after TB2.

When the UE receives a plurality of TBs (TB1, TB2, TB3) in one TTI in downlink (or when the base station receives a plurality of TBs in one TTI in uplink), the MCS having the lowest MCS index may be applied to the TB (e.g., TB1) having the highest required QoS and may be received first in time. The MCS with the next lowest MCS index is applied to the TB with the next highest required QoS (e.g., TB2) and is received after TB1. The MCS with the next lowest MCS index is applied to the TB with the next highest required QoS (e.g., TB3) and is received after TB2.

The data channel may be a Physical Downlink Shared Channel (PDSCH), a Physical Uplink Shared Channel (PUSCH), or a Physical Sidelink Shared Channel (PSSCH). When the data channel is the PSSCH, sidelink control information (SCI) may be used instead of the DCI, and according to the present disclosure, information included in the DCI may be included in the SCI.

When the UE receives transport blocks, the UE demodulates the transport blocks. In this case, the transport blocks may be transport blocks including, for example, downlink data/control information for the UE in terms of content, and it may include a plurality of logical channel data and CRC requiring different QoS.

When the UE transmits a transport block, the UE modulates the corresponding transport block. In this case, the transport block may include, for example, data of the UE/information to be reported to base station in terms of content, and it may include a plurality of logical channel data and CRC requiring different QoS.

A technique for scheduling data communication from a plurality of transmission reception points (TRPs) through a conventional DCI and the present disclosure are differentiated in the following points. That is, in the present disclosure, the DCI may schedule reception of a plurality of TBs within one TTI from one TRP or transmission of a plurality of TBs within one TTI to one TRP. On the other hand, in the prior art. DCI is for the situation of receiving TBs from different TRPs.

Hereinafter, each step of FIG. 15 will be described in detail.

<How to Deliver MCS for Each TB Through DCI>

If the number of bits of DCI required to deliver MCS is M, when the $N_{TB}$ TBs are transmitted through different MCSs, the number of DCI bits required increases by ($N_{TB}$-1) X M compared to the case where the $N_{TB}$ TBs are transmitted through a single MCS.

This increase in the number of bits of DCI increases the resource used for the control channel, resulting in a decrease in system capacity. Therefore, there is a need for a technology capable of delivering the MCS for each TB while minimizing the increase in the number of DCI bits.

The lower the MCS of the TB (that is, as a lower-order modulation scheme and a lower code rate are used), the lower the BLER. When BLER is lowered, the probability of successful data transmission with only a small number of transmissions increases, so the transmission delay is also reduced. Therefore, as the target transmission reliability is higher and the target transmission latency is lower, it may be more efficient to use a lower MCS.

When transmitting multiple logical channels with different QoSs by applying independent MCSs to a plurality of TBs scheduled by one DCI, let the DCI be DCI for multi-TB multi-MCS transmission. In multi-TB multi-MCS transmission, a logical channel requiring high transmission reliability and low transmission delay is transmitted first by applying low MCS, and a logical channel tolerant of relatively low transmission reliability and high transmission delay can be transmitted later by applying high MCS. This can improve overall transmission quality and efficiency.

In the above method, MCS indices of TBs are increasing from a low value to a high value. In the DCI, the MCS index of the first TB is transmitted as it is, and the MCS indices of the second and subsequent TBs transmit only the difference (offset) from the MCS index of the TB transmitted immediately before. Thereby, it is possible to transmit with a smaller number of bits without loss of MCS information.

Figure 16:
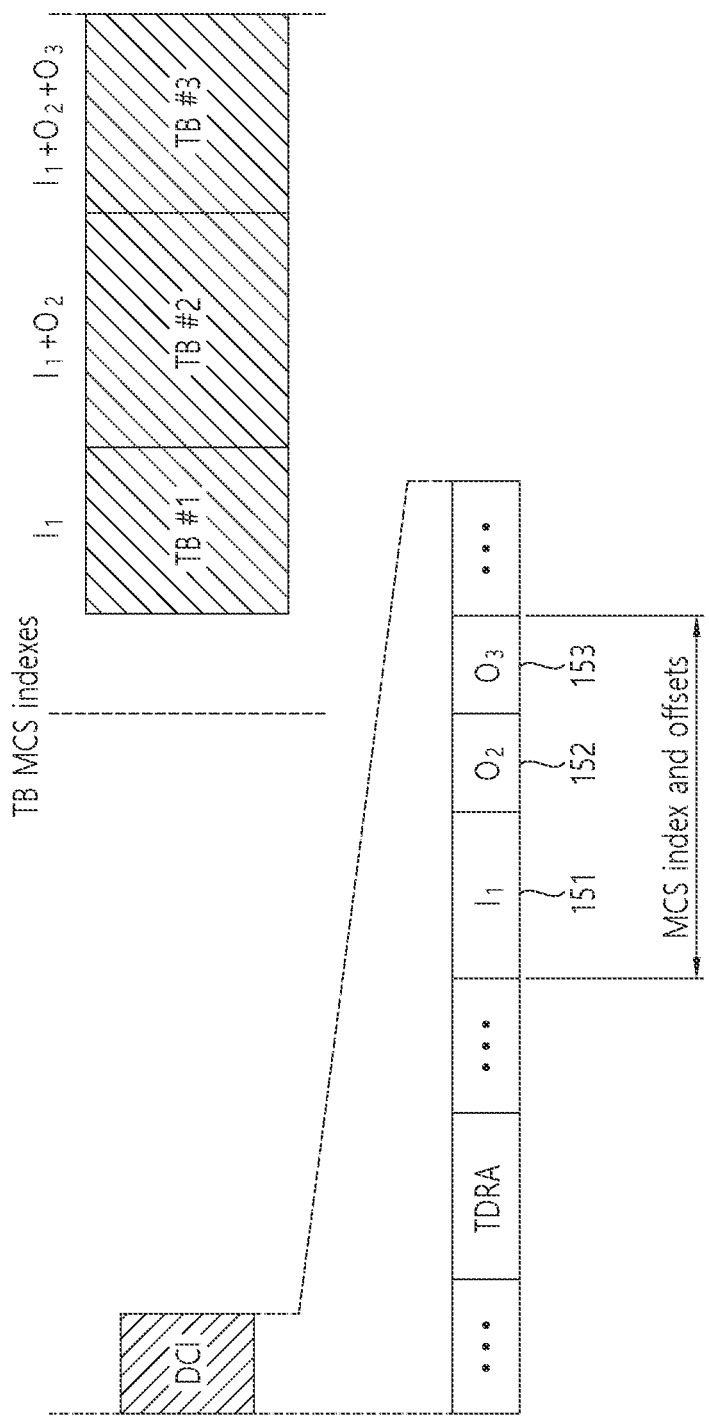
FIG. 16 is an example of transmitting MCS information for a plurality of TBs transmitted in an ascending MCS index order through one DCI.

FIG. 16 is an example of transmitting MCS information for a plurality of TBs transmitted in an ascending MCS index order through one DCI.

Referring to FIG. 16, the entire MCS index 151 is transmitted for the first TB in DCI, and only differences 152 and 153 from the MCS index of the immediately preceding TB are transmitted for subsequent TBs. The UE may calculate the MCS index of each TB by using this information.

In DCI, $I_1$ (151) is the MCS index of TB #1, $O_2$ (152) is the MCS index of TB #2 minus the MCS index of TB #1, and $O_3$ (153) is the MCS index of TB #3 minus the MCS index of TB #2. The MCS index after TB #2 can be obtained by adding all MCS index offsets up to the corresponding TB to the MCS index of TB #1.

For example, when transmitting $N_{TB}$ TBs, the MCS index of the first TB is given as I, and the MCS index In of the n-th TB after the second may be expressed as follows.

$$I_n = I_1 + \sum_{i=2}^{n} O_i, n = 2, \ldots, N_{TB} \quad \text{[Equation 2]}$$

The UE may know the MCS index ($I_{MCS,i}$, i=1, 2 ..., $N_{TB}$) of each TB based on I; and Equation 2 above.

<How to Deliver the Amount of Resources Allocated to Each TB Through DCI>

The base station may transmit the number of OFDM symbols allocated to the UE through a Time Domain Resource Assignment (TDRA) field/information of DCI. The TDRA field/information of DCI may include information indicating a specific index of a Time Domain Resource Allocation Table (TDRA Table) that is predefined in the standard or delivered as an RRC message.

The TDRA table may include information on the number (length) of a start symbol and an allocated symbol within one transmit time interval (TTI). When a plurality of TBs are transmitted, length information as much as the maximum number of TBs may be included in the TDRA table. Through this, the number of TBs and the amount of resources (number of symbols) allocated to each TB can be shared between the base station and the UE.

Table 5-1 below shows an example of a TDRA table for the base station and the UE to share the resource amount (=number of symbols, length) allocated to each TB when up to three TBs can be transmitted through one PDSCH in downlink (DL). That is, Table 5-1 below is an example of a time domain resource allocation table for a base station to transmit a plurality of TBs.

TABLE 5-1

| Row index | dmrs-TypeA-Position | PDSCH mapping type | $K_0$ | S | $L_1$ | $L_2$ | $L_3$ |
|---|---|---|---|---|---|---|---|
| 1 | 2 | Type A | 0 | 2 | 4 | 4 | 4 |
|   | 3 | Type A | 0 | 3 | 3 | 4 | 4 |
| 2 | 2 | Type A | 0 | 2 | 5 | 5 | 0 |
|   | 3 | Type A | 0 | 3 | 9 | 0 | 0 |
| ... | | | | | | | |
| 8 | 2, 3 | Type B | 0 | 5 | 4 | 3 | 0 |
| ... | | | | | | | |

In Table 5-1, a PDSCH mapping type may be classified according to a location of a demodulation reference signal (DMRS). (For example, in Type A, DMRS is located in the 3rd or 4th symbol of the slot, and in Type B, DMRS is located in the 1st symbol of the allocated PDSCH). $K_0$ means an offset between a downlink slot for receiving a PDCCH (DCI) for downlink scheduling and a downlink slot for receiving a PDSCH scheduled by the PDCCH (DCI).

S means the start symbol index in the slot.

Resources (the number of consecutive symbols, which may be expressed as 'length') allocated to each TB are indicated through L1, L2, and L3. The number of TBs actually transmitted is equal to the number of lengths having a non-zero value, and the sum of all lengths becomes the total length allocated to the PDSCH.

Table 5-2 below shows an example of a TDRA table for sharing the amount of resources (=number of symbols, length) allocated to each TB by the base station and the UE when up to two TBs can be transmitted through one PUSCH in the uplink (UL). That is, Table 5-2 below is an example of a time domain resource allocation table for the UE to transmit a plurality of TBs.

TABLE 5-2

| Row index | PUSCH mapping type | $K_2$ | S | $L_1$ | $L_2$ |
|---|---|---|---|---|---|
| 1 | Type A | j | 0 | 14 | 0 |
| 2 | Type A | j | 0 | 12 | 0 |
| 3 | Type A | j | 0 | 10 | 0 |
| 4 | Type B | j | 2 | 10 | 0 |
| 5 | Type B | j | 4 | 10 | 0 |
| ... | | | | | |
| 15 | Type A | j + 3 | 0 | 14 | 0 |
| 16 | Type A | j + 3 | 0 | 10 | 0 |
| 17 | Type A | j | 0 | 7 | 7 |
| 18 | Type A | j | 0 | 6 | 6 |
| ... | | | | | |
| 32 | Type B | j + 3 | 0 | 6 | 4 |

In Table 5-2, the PUSCH mapping type may be classified according to the location of the DMRS. (For example, in Type A, DMRS is located in the 3rd or 4th symbol of the slot, and in Type B, DMRS is located in the 1st symbol of the allocated PUSCH). $K_2$ means an offset between a downlink slot for receiving a PDCCH (DCI) for uplink scheduling and an uplink slot for transmitting a PUSCH scheduled by the PDCCH (DCI).

S means the start symbol index in the slot.

Resources (the number of consecutive symbols, which may be expressed as 'length') allocated to each TB are indicated through L1 and L2. The number of TBs actually transmitted is equal to the number of lengths having a non-zero value, and the sum of all lengths becomes the total length allocated to the PUSCH. Table 5-2 is merely an example for understanding, and is not limited thereto.

Tables such as Tables 5-1 and 5-2 described above may be configured according to the number of L, respectively. For example, a table of the form shown in Table 5-1 may be configured for a case in which L is 3 (including L1, L2, L3) and a case in which L is 4 (including L1, L2, L3, La), respectively. These tables may be determined in advance by a standard or provided by the base station to each UE through a higher layer signal such as an RRC message.

Tables similar to Tables 5-1 and 5-2 described above may be predefined or signaled in the sidelink as well.

Table 6 illustrates an Information Element (IE) included in the higher layer message when the TDRA table is transmitted as a higher layer message such as RRC.

TABLE 6

```
PDSCH-TimeDomainResourceAllocationList-MultiTB ::= SEQUENCE (SIZE(1..maxNrofDL-
Allocations)) OF PDSCH-TimeDomainResourceAllocation-MultiTB
PDSCH-TimeDomainResourceAllocation-MultiTB ::=   SEQUENCE {
   k0                  INTEGER(0..32) OPTIONAL,
   mappingType         ENUMERATED {typeA, typeB},
   startSymbol         INTEGER (0..13),
      lengthList           SEQUENCE (SIZE(1..maxNrofTBsInAPDSCH)) OF PDSCH-Length
}
PDSCH-Length ::=       SEQUENCE {
   length              INTEGER(0..14)
}
```

In the table, values related to L1, L2, and Ls may be included in 'lengthList'.

When all TBs transmitted through one shared channel are transmitted equally so that the same number of symbols or a difference between the number of symbols is within 1, the length of each TB may be determined only by the total length of the shared channel and the number of TBs. That is, even if the length for each TB is not separately provided, the length for each TB can be known only from the total length of the shared channel and the number of TBS.

For example, if the total length of the shared channel is L and the number of TBs is $N_{TB}$, the symbol length Ln (n=1, . . . , $N_{TB}$) of each TB may be calculated as follows.

[Equation 3]

$$R = L \bmod N$$
if R is 0,
$$L_n = L/N_{TB}, \quad n = 1,...,N_{TB}$$
else
$$L_n = \lceil L/N_{TB} \rceil, \quad n = 1,...,R$$
$$L_n = \lfloor L/N_{TB} \rfloor, \quad n = R + 1,...,N_{TB}$$

Figure 17:
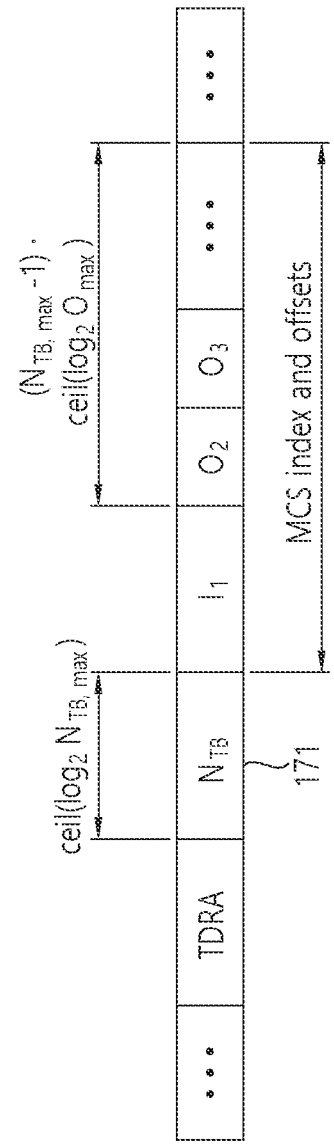
FIG. 17 is an example of a DCI format for explicitly indicating the number of TBs.

FIG. 17 is an example of a DCI format for explicitly indicating the number of TBs.

The total length of the shared channel, that is, the total number of symbols of the shared channel, may be determined by i) a TDRA table defined in the standard or a TDRA table transmitted through a higher layer message such as RRC, and ii) a TDRA value transmitted through DCI. The number of TBs may be transmitted through a specific field 171 of DCI as shown in FIG. 17.

If the maximum number of transmittable TBs is $N_{TB}$, max, the number of DCI bits required to inform the number of TBs is [$\log_2 N_{TB,max}$]. For example, if $N_{TB}$, max is 4, the number of DCI bits required to transmit the number of TBs is 2. If the DCI bit value is 0, the number of TBs is 1, if the DCI bit value is 1, the number of TBs is 2, and if the DCI bit value is 2, the number of TBs is 3, and if the DCI bit value is 3, it may indicate that the number of TBs is 4. That is, when the number of transmitted TBs is $N_{TB}$ (an integer >0), the value $N_{TB}$-1 may be transmitted through DCI.

The maximum number of transmittable TBs, $N_{TB}$ max, may be defined in the standard or may be transmitted through a higher layer message such as RRC. In FIG. 17. $O_{max}$ means the maximum value that the MCS index difference value can have.

<TB-based retransmission method>

TB-based retransmission can be used to increase retransmission efficiency. In the TB-based retransmission, when a transmission error occurs in some TBs, only the error TB is retransmitted without retransmitting all TBs (in the TTI).

When TB-based retransmission is used, Transport Block Transmission Information (TBTI) indicating whether to transmit for each TB may be included in DCI. For example, a TBTI bit of 1 bit may be used for each TB, for example, if the value of I bit for each TB is 0, it may indicate that the corresponding TB is not transmitted, and if the value of 1 bit for each TB is 1, it may indicate that the corresponding TB is transmitted (and vice versa).

In the CBG-based retransmission method, all CBGs in the TB are always transmitted at the time of initial transmission, and only the CBG to which the NACK is fed back is retransmitted. Assuming that the field indicating the retransmitted CBG is called CBGTI (CBG transmission information) and consists of N (one of 2, 4, 6, 8) bits, at the time of initial transmission, all N bits of the CBGTI are I (i.e., indicating that all CBGs are transmitted) or should be considered/assumed to be all 1.

On the other hand, in TB-based retransmission, all TBs that can be transmitted within the TTI are not always transmitted during initial transmission. Accordingly, the values of all bits of the TBTI field are not I or not considered/assumed to be I at the time of initial transmission. In this respect, it is different from the CBG-based retransmission method.

If the maximum number of TBs that can be scheduled by DCI is $N_{TB,max}$, DCI may include $N_{TB,max}$ TBTI bits.

Figure 18:
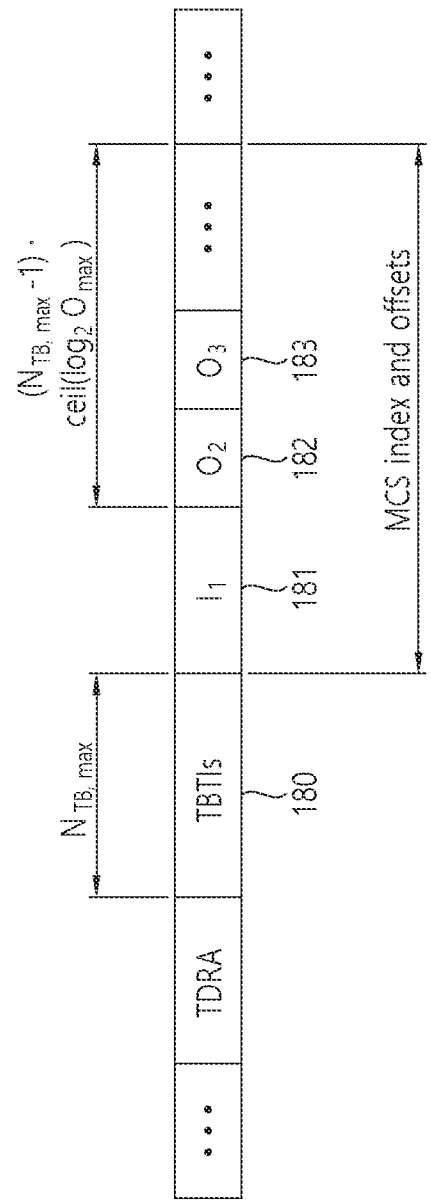
FIG. 18 shows an example in which a DCI format for scheduling transmission of a plurality of TBs includes a TBTI.

FIG. 18 shows an example in which a DCI format for scheduling transmission of a plurality of TBs includes a TBTI.

Referring to FIG. 18, the DCI format may include TDRA, $N_{TB,max}$ TBTI bits, the MCS index 181 of the first TB and MCS index difference values 181 and 182 for the second and subsequent TBs. $O_{max}$ represents the maximum value that the MCS index difference value can have.

When TBTI (Transport Block Transmission Information) indicating whether to transmit each TB is used, the number of TBs may be informed by the TBTI. For example, when the maximum number of transmittable TBs is $N_{TB,max}$, the TBTI may be composed of $N_{TB,max}$ bits, one bit for each TB. The number of TBTI bits indicating that the corresponding TB is transmitted becomes the number of TBs that are actually transmitted. $N_{TB}$. For example, if $N_{TB,max}$ is 4, a value of 0 of the TBTI bit indicates that the corresponding TB is not transmitted, and 1 indicates that the corresponding TB is transmitted, If TBTI is '1110', $N_{TB}$ becomes 3, and if TBTI is '1010', $N_{TB}$ becomes 2. In this case, there is no need to explicitly transmit the number of TBs.

That is, in FIG. 17, the $N_{TB}$ field 171 is explicitly included in the DCI format and the NTE value is transmitted/provided through the $N_{TB}$ field 171. In FIG. 18, the $N_{TB}$ field is not included, but the TBTI field 180 is included instead, and the $N_{TB}$ value can be implicitly transmitted/provided through the number of TBTI bits indicating that the TB is transmitted in the TBTI field 180.

Figure 19:
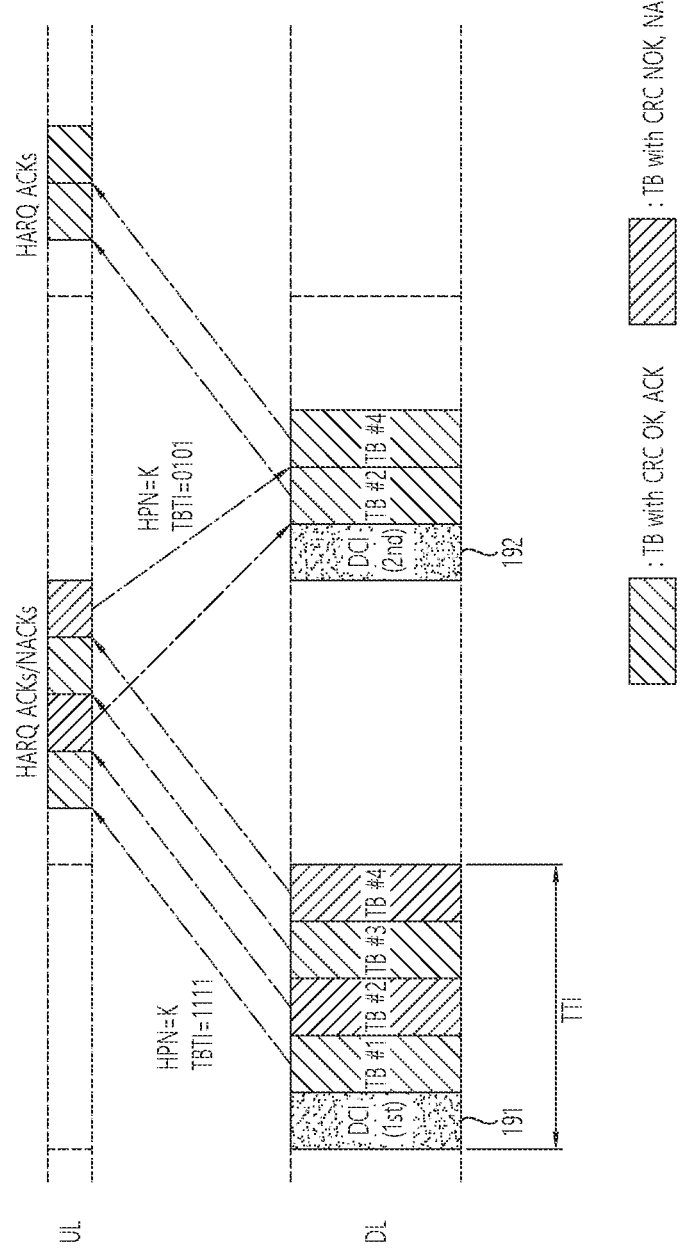
FIG. 19 illustrates a case of performing TB-based retransmission.

FIG. 19 illustrates TB based retransmission.

Referring to FIG. 19, in the first transmission of the base station, the value of the TBTI field of the first DCI 191 is '1111', the HARQ process number (HPN) is K, and the UE may receive TB #1, 2, 3, 4. Since a CRC error does not occur for TB #1,3, the UE feeds back ACKs for them to the base station, and a CRC error occurs for TB #2.4 so that NACKs for them can be fed back.

Thereafter, the UE may receive the second DCI 192 from the base station, the value of the TBTI field of the second DCI 192 may be '0101', and the HARQ process number (HPN) may be K. In this case, the UE may receive TB #2,4, and since a CRC error does not occur for TB #2,4, the UE may feed back ACKs for them to the base station.

On the other hand, even for a TB indicated not to be transmitted through a specific bit of the TBTI, the MCS index or the MCS index difference value for the TB may be regarded as a valid value. For example, even if the first TB and the third TB are retransmitted and the second TB is not retransmitted, the MCS index difference value $O_2$ of the second TB may still be considered a valid value. This is because, when the difference between the MCS index of the first TB and the MCS index of the third TB is large, there is an advantage in that the expression range of the MCS index can be expanded by using the difference value of the MCS index of the second TB.

As another example, if the second TB and the third TB are retransmitted and the first TB is not retransmitted, I: corresponding to the MCS index of the first TB is set to the same value as the MCS index of the second TB, and by setting the MCS index difference value $O_2$ of the second TB to 0, the MCS index calculation method described above can be consistently applied.

If the MCS index or MCS index difference value of the TB indicated that it is not transmitted through any bit of the TBTI is invalid. I may be the MCS index of the first TB to be retransmitted.

Whether the MCS index or the MCS index difference value of the TB indicated not to be transmitted through the TBTI is valid may be informed through a higher layer message such as RRC.

<TB-based separated retransmission method>

There are two types of the MCS index, one including both modulation order and code rate information and one including only modulation order information.

For example, when 5G NR supports QPSK, 16QAM, 64QAM, and 256QAM, MCS indices 0 to 27 include both modulation order and code rate information and may be used for both initial transmission and retransmission. On the other hand, MCS indices 28 to 31 include only modulation order information and can be used only for retransmission.

Table 7 below illustrates a table including the MCS index.

TABLE 7

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

In Table 7. MCS indices 0 to 27 include both modulation order and code rate information and may be used for both initial transmission and retransmission. On the other hand, MCS indices 28 to 31 include only modulation order information and can be used only for retransmission.

During retransmission, the size of each TB should match the size of the TB at the time of initial transmission. When the base station uses the MCS index including only the modulation order information during retransmission, the UE can match the TB size of the initial transmission and the TB size of the retransmission by reusing the TB size of the initial transmission. However, if the UE does not receive the DCI for initial transmission and the base station does not recognize it, and retransmits using the MCS index including only the modulation order information, a problem arises that the UE cannot determine the TB size.

This problem can be improved by using the MCS index, which includes both modulation order and code rate information, by the base station even during retransmission. However, when retransmission, the MCS index should be selected so that the same TB size as the initial transmission is calculated. This may reduce the scheduling flexibility of the base station, and in some cases, it may be difficult to select such an MCS index. When a plurality of TBs are retransmitted in ascending order of the MCS index, this difficulty may be increased.

This problem can be solved through the following TB-based separated retransmission.

Figure 20:
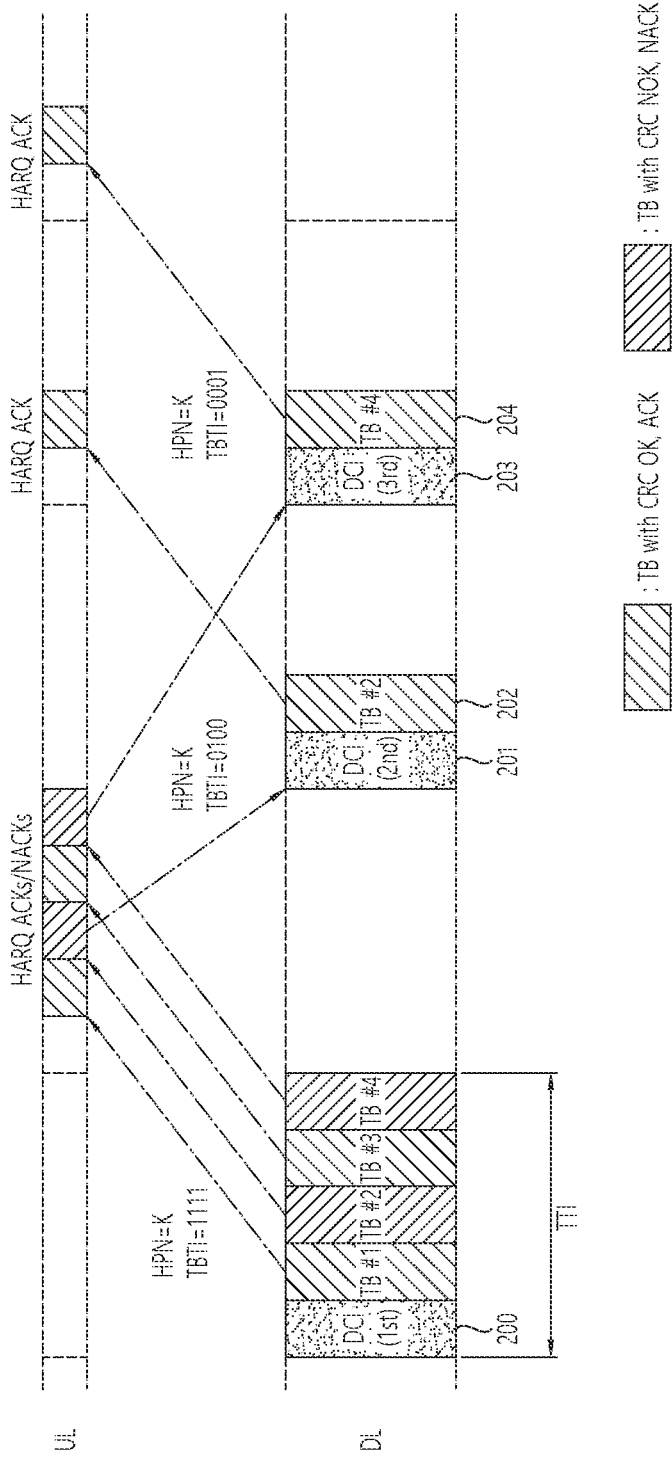
FIG. 20 is an example of TB-based separated retransmission.

FIG. 20 is an example of TB-based separated retransmission.

Referring to FIG. 20, when the base station tries to retransmit a plurality of TBs using the MCS index including both modulation order and code rate information, there may be cases in which it is difficult to retransmit in ascending order of the MCS index while maintaining the TB size the same as the initial transmission.

In this case, TBs to be retransmitted may be divided into a plurality of 'DCI and shared channel' pairs and transmitted.

For example, in the first transmission (HPN=K), the TBTI field of the first DCI 200 may be '1111'. That is, four TBs (TB #1, 2, 3. 4) may be scheduled/transmitted. Among the four TBs, the first TB (TB #1) and the third TB (TB #3) were successfully transmitted, but a CRC error may occur in the second TB (TB #2) and the fourth TB (TB #4). That is, NACKs may be received from the UE for the second and fourth TBs among the four TBs transmitted by the base station.

The base station tried to retransmit the second TB (TB #2) and the fourth TB (TB #4) using the MCS index including both modulation order and code rate information, but it may be difficult to transmit the TBs by sorting in ascending order of the MCS index while maintaining the same size as the initial transmission. In this case, as shown in FIG. 20, the second TB (TB #2) and the fourth TB (TB #4) with the same HARQ process number (HPN=K) may be divided into DCI and PDSCH, respectively, and retransmitted. That is, after transmitting the second TB (TB #2) through the second DCI 201 and the second PDSCH 202, the fourth TB (TB #4) can be transmitted through the third DCI 203 and the third PDSCH 204. The TBTI of the second DCI is '0100', and the TBTI of the third DCI is '0001'.

The above-described TB-based transmission/retransmission may be used for at least one of downlink, uplink, and sidelink. TB-based transmission/retransmission is performed by a base station in downlink, and in this case, DCI may be a DCI format for scheduling a downlink data channel (e.g., PDSCH). TB-based transmission/retransmission is performed by the UE in the uplink. In this case, the DCI may be a DCI format for scheduling an uplink data channel (e.g., PUSCH). TB-based transmission/retransmission is performed by the UE in the sidelink. In this case, the SCI may be an SCI format for scheduling a sidelink data channel (e.g., PSSCH).

<Variable Operation of MCS Index Difference Value Bits>

The MCS index difference value bits may be variably operated according to the number of TBs that are actually transmitted. For example, a maximum of 4 TBs can be transmitted on one shared channel. In this case, it is assumed that 2 bits can be used as the MCS index difference value for each TB except for the first TB. Then, the total number of bits allocated as the MCS index difference value is 6 bits.

In the above example, when only 3 TBs are retransmitted, if 6 bits are divided and allocated to the remaining 2 retransmission TBs except for the first retransmission TB among the 3 retransmission TBs, 3 bits can be used for each retransmission TB. When only two TBs are retransmitted, all 6 bits may be used for the remaining retransmission TB except for the first retransmission TB among the two retransmission TBs. When the number of bits of the MCS index difference value for each TB increases, the range of the MCS index value that can be expressed is widened, so that scheduling flexibility can be increased.

When two or more TBs are transmitted through one shared channel, let the number of transmitted TBs be $N_{TB}$ and the total number of bits of MCS index difference values be $N_{total-offset-bits}$. Then, the number of bits $N_{offset-bits,a}$ for the MCS index difference value for each TB from and after the second TB can be obtained as follows.

[Equation 4]

$R = N_{total-offset-bi} \mod(N_{TB} - 1)$
if R is 0,
$N_{offset-bit,n} = N_{total-offse} /(N_{TB} - 1), n = 2,...,N_{TB}$
else
$N_{offset-bit,n} = \lceil N_{total-offset-bit} /(N_{TB} - 1) \rceil, n = 2,...,R + 1$
$N_{offset-bit,n} = \lfloor N_{total-offset-bi} /(N_{TB} - 1) \rfloor, n = R + 2,...,N_{TB}$ <Method of Configuring the MCS Index for Each TB at the Initial Transmission>

The maximum value of the MCS index difference value is determined according to the number of bits for transmitting the difference value. However, the maximum value may be smaller than a difference value between MCS indices to be actually transmitted. When the difference between the MCS indices to be transmitted is greater than the maximum value of the MCS index difference that can be transmitted through DCI, the base station may set the MCS index difference value transmitted through DCI to the maximum transmittable value. Then, the actual transmitted MCS index becomes smaller than the MCS index to be transmitted, so the transmission efficiency may be somewhat lowered, but there is no major problem in satisfying the QoS required for the data stream.

Let assume that the MCS index of the first TB transmitted through DCI is $I_1$, the MCS index required for the nth (n being an integer >1) TB is $I_{req.n}$, the maximum value of the difference of the MCS index of the nth TB that can be transmitted through DCI is $O_{max,n}$ (being integer>0)). Then, the base station may transmit the MCS index $O_n$ (an integer >0) of the nth TB as follows.

$$O_n = \min\left(O_{max,n}, I_{req,n} - \left(I_i + \sum_{i=2}^{n-1} O_i\right)\right) \quad \text{[Equation 5]}$$

Figure 21:
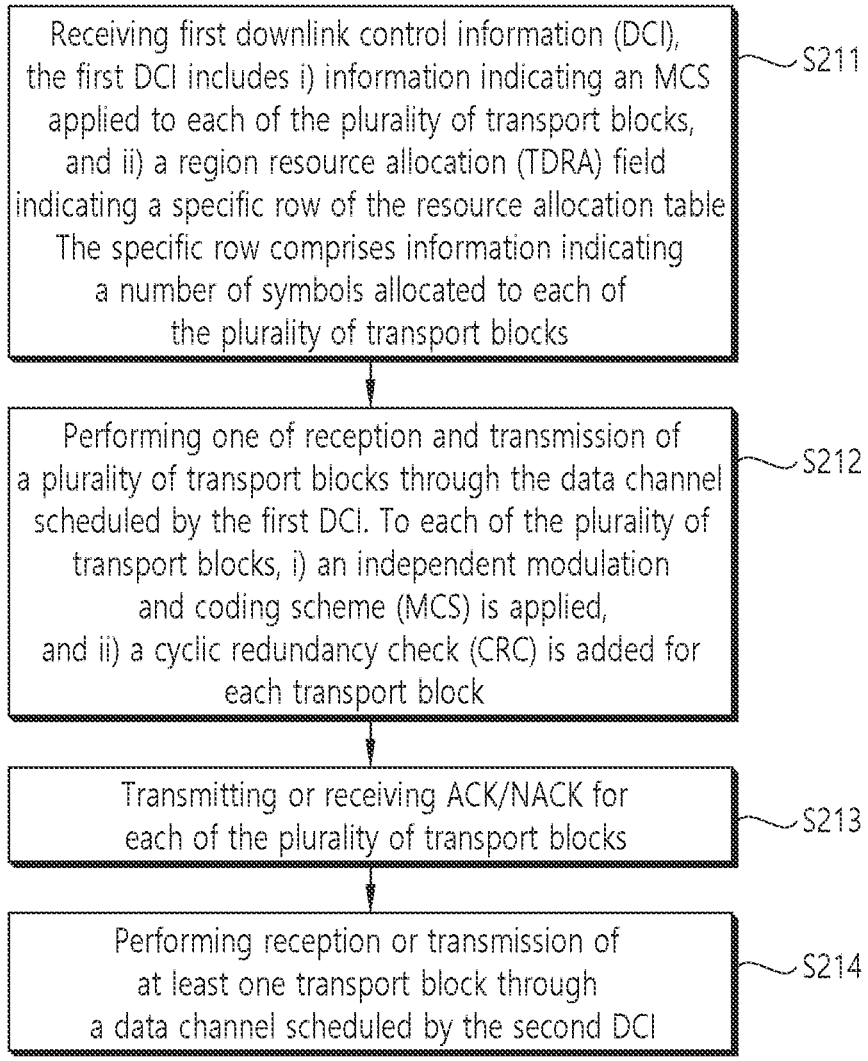
FIG. 21 is a diagram illustrating a method for processing a transport block of a UE according to an embodiment of the present disclosure.

FIG. 21 illustrates a transport block processing method of a UE.

Referring to FIG. 21, the UE receives first downlink control information (DCI) (S211). The first DCI is received through a PDCCH. The DCI may be DCI for multi-TB multi-MCS transmission.

The first DCI may include at least one of the following information.

1) Time domain resource assignment (TDRA) information: This information/field may indicate a specific index in the TDRA table including length (number of symbols) information for each TB or the entire shared channel.

That is, the DCI includes a time domain resource allocation (TDRA) field indicating a specific row of a resource allocation table (TDRA table), and the specific row may include information indicating the amount of resources (e.g., the number of symbols) allocated to each of the plurality of transport blocks. The resource allocation table may be defined by a standard as shown in Table 5 or delivered to the UE through a higher message such as RRC as shown in Table 6.

2) Number of TBs to be transmitted: This information/field may be included when the TDRA table consists of the number of TBs and the total length of the shared channel (rather than the length for each TB). This information conveys the number of TBs to be transmitted and consists of the number of $\lceil \log_2 N_{TB,max} \rceil$ bits. $N_{TB,max}$ is the maximum number of transmittable TBs. That is, the DCI may include a field indicating the number of a plurality of transport blocks.

3) Transport Block Transmission Information (TBTI): This information/field may be included when TB-based retransmission is used, and may indicate whether to transmit each TB. When the maximum number of transmittable TBs is $N_{TB,max}$, it consists of $N_{TB,max}$ bits. If the number of TBs is not explicitly provided through DCI and if the number of TBs transmitted is not known by the TDRA information because the TDRA table includes only the shared channel full length information, the number of TBs transmitted can be provided by the TBTI.

That is, the DCI may include a TBTI field indicating whether to transmit each TB. The TBTI field includes a plurality of bits, and the number of the plurality of transport blocks may be informed through the number of bits having a specific value (e.g., 1, which is a value indicating transmission of the transport block) among the plurality of bits.

4) MCS index information of the first TB: the number of bits is determined by the size of the MCS table (e.g., Table 7 above). For example, when the number of MCS indices included in the MCS table is 32, this information/field may consist of 5 bits. When TB-based retransmission is used, it may mean the MCS index of the first TB among the retransmitted TBs.

5) MCS index difference value for each TB: The difference value between the MCS indices of the second and subsequent TBs (or retransmission TBs) and the immediately preceding TB is transmitted.

That is, the first DCI may include information indicating the MCS applied to each of the plurality of transport blocks. The first DCI includes a first MCS index for a first transport block having the smallest MCS value among the plurality of transport blocks, and an offset value for a second transport block having a smaller MCS value next to the first transport block. The offset value is a difference value between the second MCS index for the second transport block and the first MCS index. The first DCI includes an offset value for a third transport block having a smaller MCS value next to the second transport block. The offset value is a difference value between the third MCS index for the third transport block and the second MCS index. An MCS to be applied to each of the plurality of transport blocks may be determined according to a transmission quality (e.g., QoS) required for each of the plurality of transport blocks.

As such, the first DCI informs the MCS indices of the plurality of transport blocks arranged in ascending order through the smallest MCS index and at least one offset value. This has been described in detail with reference to FIG. 16.

In S211, an example in which the first DCI includes i) information indicating an MCS applied to each of the plurality of transport blocks, for example, 4), 5) and ii) a region resource allocation (TDRA) field indicating a specific row of the resource allocation table, for example, 1) described above, is described.

The first DCI may include at least one information from among 1) to 5) described above in various combinations.

The UE performs one of reception and transmission of a plurality of transport blocks through the data channel scheduled by the first DCI (S212). In this case, i) independent MCS is applied to each of the plurality of transport blocks, and ii) a CRC for each transport block is transmitted.

The data channel may be PDSCH, PUSCH or PSSCH.

The UE generates/transmits or receives ACK/NACK for each of the plurality of transport blocks (S213). In the process of receiving data in the downlink, an ACK/NACK may be generated and transmitted to the base station, and in the process of transmitting data in the uplink, the ACK/NACK may be received from the base station.

The UE receives the second DCI, and performs reception or transmission of at least one transport block through a data channel scheduled by the second DCI (S214).

The second DCI may include at least one information from among 1) to 5) described above in various combinations.

When the TBTI field is included in the second DCI, only a transport block, indicated by a bit having a specific value in the TBTI field included in the second DCI among the plurality of transport blocks, may be retransmitted.

Although not shown in FIG. 21, when TB-based separated retransmission is applied, the method may further include receiving a third DCI and a TB scheduled by the third DCI. Among the plurality of transport blocks, transport blocks to which the UE feeds back the NACK may be separated and retransmitted by the second DCI and the third DCI.

Figure 22:
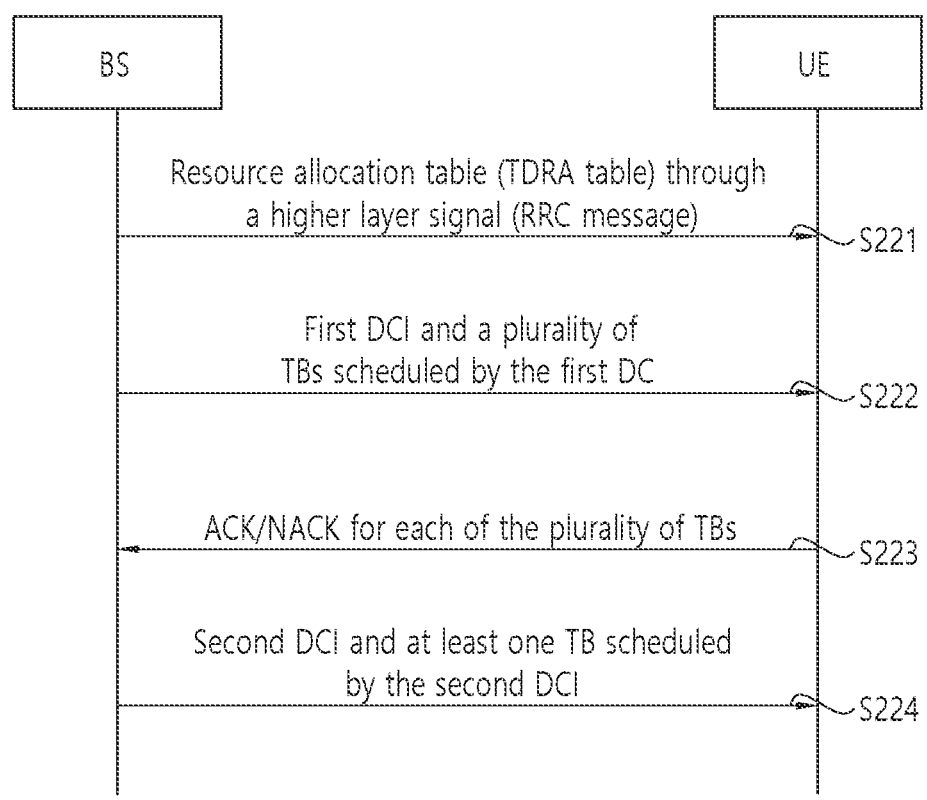
FIG. 22 illustrates signaling between a base station and a UE according to an embodiment of the present disclosure.

FIG. 22 illustrates signaling between a base station and a UE according to an embodiment of the present disclosure.

Referring to FIG. 22, the base station provides a resource allocation table (TDRA table) to the UE through a higher layer signal (RRC message) (S221).

The base station transmits the first DCI and a plurality of TBs scheduled by the first DCI to the UE (S222). As described above, a different MCS may be applied to each TB according to QoS required and a CRC may be added, and the MCS and resource amount applied to each TB may be indicated by the first DCI.

The UE transmits ACK/NACK (HARQ-ACK) for each of the plurality of TBs to the base station (S223).

The base station transmits the second DCI and at least one TB scheduled by the second DCI to the UE (S224). The base station may determine a TB to be retransmitted based on the ACK/NACK information, and configure each field of the second DCI accordingly.

That is, from the perspective of the base station, the base station transmits downlink control information (DCI) to the UE, and performs one of transmission and reception of a plurality of transport blocks within one TTI scheduled by the DCI. In this case, i) an MCS independent of each other is applied to each of the plurality of transport blocks, and ii) a CRC for each transport block is added. The DCI includes i) information indicating the MCS applied to each of the plurality of transport blocks, and ii) a time domain resource allocation (TDRA) field indicating a specific row of a resource allocation table. The specific row may include information indicating the number of symbols allocated to each of the plurality of transport blocks. The base station may receive ACK/NACK for the plurality of transport blocks from the UE or transmit it to the UE. Thereafter, some or all of the plurality of transport blocks may be retransmitted or received again based on the ACK/NACK information. These operations may be performed by the processor 202 of the base station.

According to the present disclosure, it is possible to efficiently support multiple QoS transmission without additionally using a control channel such as PDCCH. When transmitting two or more logical channels or logical channel groups that require different QoS as one shared channel, radio resources can be efficiently used by mapping to different transport blocks according to the target BLER and delay time of each logical channel or logical channel group, and independently allocating MCS, resource amount, etc. to each transport block.

That is, it is possible to efficiently use radio resources and increase system capacity by allocating radio resources and modulation coding schemes differently according to physical transmission quality required for a plurality of transport blocks scheduled through one DCI. In addition, the overhead for signaling the DCI can be minimized, thereby facilitating multiple QoS service support.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

The technical features of the present specification may be implemented directly in hardware, in software executed by a processor, or a combination of the two. For example, in wireless communication, a method performed by a wireless device may be implemented in hardware, software, firmware, or a combination thereof. For example, the software may reside in RAM, flash memory, ROM. EPROM, EEPROM, registers, hard disk, a removable disk, a CD-ROM, or other storage medium.

Some examples of a storage medium may be coupled to the processor such that the processor can read information from the storage medium. Alternatively, the storage medium may be integrated into the processor. The processor and the storage medium may be in the ASIC. In another example, the processor and the storage medium may exist as separate components.

Computer-readable media may include tangible, non-transitory computer-readable storage media.

For example, non-transitory computer-readable media may include RAM such as synchronous dynamic RAM (SDRAM), ROM, non-volatile RAM (NVRAM), EEPROM, flash memory, magnetic or optical data storage media or may include other media that can be used to store the instructions or data structures. The non-transitory computer-readable medium may include a combination of the above.

In addition, the methods described herein may be realized, at least in part, by computer readable communication media that carry or communicate code in the form of instructions or data structures and which a computer can access, read and/or execute.

According to some implementations herein, a non-transitory computer-readable medium (CRM) stores a plurality of instructions.

More specifically. CRM stores instructions that cause actions to be performed by one or more processors. The operation includes receiving downlink control information (DCI) and performing one of reception and transmission of a plurality of transport blocks within one TTI scheduled by the DCI. To each of the plurality of transport blocks, i) an MCS independent of each other is applied, and ii) a CRC for each transport block is added. The DCI includes i) information indicating the MCS applied to each of the plurality of transport blocks, and ii) a time domain resource allocation (TDRA) field indicating a specific row of a resource allocation table. The specific row includes information indicating the number of symbols allocated to each of the plurality of transport blocks.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method of processing a transport block of a user equipment (UE) in a wireless communication system, the method comprising:
   receiving downlink control information (DCI); and
   performing one of reception and transmission of a plurality of transport blocks within one transmit time interval (TTI) scheduled by the DCI,
   wherein, to each of the plurality of transport blocks, i) an independent modulation and coding scheme (MCS) is applied, and ii) a cyclic redundancy check (CRC) is added for each transport block,
   wherein the DCI includes i) information informing of MCS applied to each of the plurality of transport blocks, and ii) a time domain resource assignment (TDRA) field informing of a specific row of a resource allocation table, and
   wherein the specific row comprises information indicating a number of symbols allocated to each of the plurality of transport blocks.

2. The method of claim 1, wherein the DCI comprises a first MCS index for a first transport block having a smallest MCS value among the plurality of transport blocks, and an offset for a second transport block having a next smallest MCS value after the first transport block, and
   wherein the offset value is a difference value between a second MCS index for the second transport block and the first MCS index.

3. The method of claim 2, wherein the DCI includes an offset value for a third transport block having a next smallest MCS value after the second transport block, and
   wherein the offset value is a difference value between a third MCS index for the third transport block and the second MCS index.

4. The method of claim 1, wherein the DCI informs MCS indices for the plurality of transport blocks arranged in ascending order through a smallest MCS index and at least one offset value.

5. The method of claim 1, wherein the resource allocation table is preconfigured through a higher layer message.

6. The method of claim 1, wherein the DCI includes a field indicating a number of the plurality of transport blocks.

7. The method of claim 1, wherein the DCI includes a transport block transmission information (TBTI) field indicating whether to transmit each transport block.

8. The method of claim 7, wherein the TBTI field comprises a plurality of bits,
   wherein a number of the plurality of transport blocks is informed through a number of bits having a specific value among the plurality of bits.

9. The method of claim 1, further comprising:
   receiving a second DCI when the DCI is a first DCI,
   wherein only a transport block indicated by a bit having a specific value in a TBTI field included in the second DCI from among the plurality of transport blocks is re-received or re-transmitted.

10. The method of claim 1, wherein, in performing one of reception and transmission of the plurality of transport blocks, a transport block having a highest required quality of service (QOS) among the plurality of transport blocks is received or transmitted first.

11. The method of claim 1, wherein at least one of an operation of demodulating after reception of the plurality of transport blocks and an operation of transmitting after modulation of the plurality of transport blocks is performed.

12. A user equipment (UE) operated in a wireless communication system, the UE comprising:
a transceiver;
a processor connected to the transceiver; and
a memory operably coupled to the processor,
wherein the processor is adapted to:
receive downlink control information (DCI), and
perform one of reception and transmission of a plurality of transport blocks within one transmit time interval (TTI) scheduled by the DCI,
wherein, to each of the plurality of transport blocks, i) an independent modulation and coding scheme (MCS) is applied, and ii) a cyclic redundancy check (CRC) is added for each transport block,
wherein the DCI includes i) information informing of MCS applied to each of the plurality of transport blocks, and ii) a time domain resource assignment (TDRA) field informing of a specific row of a resource allocation table, and
wherein the specific row comprises information indicating a number of symbols allocated to each of the plurality of transport blocks.

13. The UE of claim 12, wherein the DCI comprises a first MCS index for a first transport block having a smallest MCS value among the plurality of transport blocks, and an offset for a second transport block having a next smallest MCS value after the first transport block, and
wherein the offset value is a difference value between a second MCS index for the second transport block and the first MCS index.

14. The UE of claim 13, wherein the DCI includes an offset value for a third transport block having a next smallest MCS value after the second transport block, and
wherein the offset value is a difference value between a third MCS index for the third transport block and the second MCS index.

15. The UE of claim 12, wherein the DCI informs MCS indices for the plurality of transport blocks arranged in ascending order through a smallest MCS index and at least one offset value.

16. The UE of claim 12, wherein the resource allocation table is preconfigured through a higher layer message.

17. The UE of claim 12, wherein the DCI includes a field indicating a number of the plurality of transport blocks.

18. The UE of claim 12, wherein the DCI includes a transport block transmission information (TBTI) field indicating whether to transmit each transport block.

19. The UE of claim 18, wherein the TBTI field comprises a plurality of bits,
wherein a number of the plurality of transport blocks is informed through a number of bits having a specific value among the plurality of bits.

20. A method performed by a base station in a wireless communication system, the method comprising:
transmitting downlink control information (DCI); and
performing one of transmission and reception of a plurality of transport blocks within one transmit time interval (TTI) scheduled by the DCI,
wherein, to each of the plurality of transport blocks, i) an independent modulation and coding scheme (MCS) is applied, and ii) a cyclic redundancy check (CRC) is added for each transport block,
wherein the DCI includes i) information informing of MCS applied to each of the plurality of transport blocks, and ii) a time domain resource assignment (TDRA) field informing of a specific row of a resource allocation table, and
wherein the specific row comprises information indicating a number of symbols allocated to each of the plurality of transport blocks.

* * * * *